(12) United States Patent
Nakamura et al.

(10) Patent No.: US 12,140,545 B2
(45) Date of Patent: Nov. 12, 2024

(54) INFORMATION PROCESSING DEVICE FOR ANALYZING A SPECIMEN

(71) Applicant: SONY GROUP CORPORATION, Tokyo (JP)

(72) Inventors: Tomohiko Nakamura, Tokyo (JP);
Kazuhiro Nakagawa, Tokyo (JP);
Hirokazu Tatsuta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 282 days.

(21) Appl. No.: 17/623,673

(22) PCT Filed: May 26, 2020

(86) PCT No.: PCT/JP2020/020809
§ 371 (c)(1),
(2) Date: Dec. 29, 2021

(87) PCT Pub. No.: WO2021/005904
PCT Pub. Date: Jan. 14, 2021

(65) Prior Publication Data
US 2022/0276170 A1    Sep. 1, 2022

(30) Foreign Application Priority Data
Jul. 9, 2019    (JP) ................. 2019-127994

(51) Int. Cl.
*G01N 21/64* (2006.01)
*G06T 7/00* (2017.01)

(52) U.S. Cl.
CPC ...... *G01N 21/6486* (2013.01); *G01N 21/6428* (2013.01); *G06T 7/0012* (2013.01);
(Continued)

(58) Field of Classification Search
CPC ............ G01N 21/6486; G01N 21/6428; G06T 7/0012; G06T 2207/10064; G06T 2207/30024
See application file for complete search history.

(56) References Cited

U.S. PATENT DOCUMENTS

| 2013/0203082 A1 | 8/2013 | Gonda et al. |
| 2013/0230866 A1 | 9/2013 | Miyashita et al. |

(Continued)

FOREIGN PATENT DOCUMENTS

| CA | 3045333 A | 6/2018 |
| CN | 103154741 A | 6/2013 |

(Continued)

OTHER PUBLICATIONS

International Search Report and Written Opinion of PCT Application No. PCT/JP2020/020809, issued on Sep. 1, 2020, 10 pages of ISRWO.

*Primary Examiner* — David P Porta
*Assistant Examiner* — Fani Polyzos Boosalis
(74) *Attorney, Agent, or Firm* — CHIP LAW GROUP

(57) ABSTRACT

There is provided a disclosure in which a specimen is analyzed with high accuracy. An information processing device includes an extraction unit that extracts fluorescence correction information from a bright visual field image of the specimen, and a generation unit that generates a fluorescence correction image based on fluorescence information of the specimen and the fluorescence correction information.

16 Claims, 21 Drawing Sheets

(52) U.S. Cl.
CPC ............... *G06T 2207/10064* (2013.01); *G06T 2207/30024* (2013.01)

(56) References Cited

U.S. PATENT DOCUMENTS

| | | | |
|---|---|---|---|
| 2016/0246045 A1 | 8/2016 | Watanabe et al. | |
| 2017/0350805 A1 | 12/2017 | Murata et al. | |
| 2017/0370901 A1 | 12/2017 | Ichitani | |
| 2018/0024059 A1 | 1/2018 | Gouda et al. | |
| 2019/0154582 A1 | 5/2019 | Gouda et al. | |
| 2019/0384963 A1 | 12/2019 | Kim et al. | |

FOREIGN PATENT DOCUMENTS

| | | | |
|---|---|---|---|
| CN | 103168242 A | 6/2013 | |
| CN | 110268414 A | 9/2019 | |
| EP | 2613151 A1 | 7/2013 | |
| EP | 2618154 A1 | 7/2013 | |
| EP | 3066513 A1 | 9/2016 | |
| EP | 3232402 A1 | 10/2017 | |
| EP | 3239287 A1 | 11/2017 | |
| EP | 3258264 A1 | 12/2017 | |
| EP | 3549099 A1 | 10/2019 | |
| JP | 2005-091895 A | 4/2005 | |
| JP | 2015-090471 A | 5/2015 | |
| JP | 2015-145829 A | 8/2015 | |
| JP | 2017-122610 A | 7/2017 | |
| JP | 2019-153341 A | 9/2019 | |
| JP | 2019-537157 A | 12/2019 | |
| KR | 10-2019-0091298 A | 8/2019 | |
| TW | 201830332 A | 8/2018 | |
| WO | 2012/029269 A1 | 3/2012 | |
| WO | 2012/035705 A1 | 3/2012 | |
| WO | WO-2013015120 A1 * | 1/2013 | ......... A61B 1/00009 |
| WO | 2015/068360 A1 | 5/2015 | |
| WO | 2016/080187 A1 | 5/2016 | |
| WO | 2016/093090 A1 | 6/2016 | |
| WO | 2016/103501 A1 | 6/2016 | |
| WO | 2016/129061 A1 | 8/2016 | |
| WO | 2018/102748 A1 | 6/2018 | |
| WO | WO-2019172097 A1 * | 9/2019 | ......... G01N 21/6428 |

* cited by examiner

32A(32,40)

CD20

32B(32,40)

CD3

32C(32,40)

CD68

32D(32,40)

DAPI

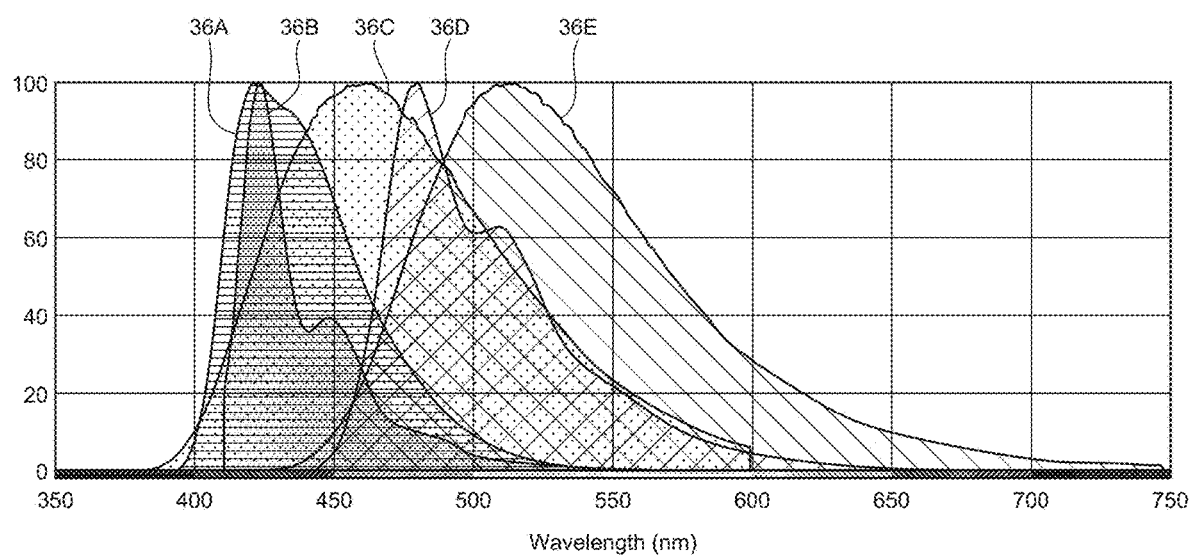

FIG.9

| PATTERN | SECTION | STAINING | A | B | C | D | E | F |
|---|---|---|---|---|---|---|---|---|
| 1 | FIRST SECTION | TUMOR MARKER | N.D. | N.D. | N.D. | IN | OUT | OUT |
| | SECOND SECTION | LYMPHOCYTE MARKER | | | | | | |
| 2 | FIRST SECTION | LYMPHOCYTE MARKER | IN | IN | OUT | N.D. | N.D. | N.D. |
| | SECOND SECTION | TUMOR MARKER | | | | | | |
| 3 | FIRST SECTION | TUMOR MARKER/ LYMPHOCYTE MARKER | IN | OUT | OUT | IN | IN | OUT |
| | SECOND SECTION | TUMOR MARKER/ LYMPHOCYTE MARKER | IN | OUT | OUT | IN | IN | OUT |
| ACTUAL | FIRST SECTION | ... | IN | OUT | OUT | IN | IN | OUT |
| | SECOND SECTION | | | | | | | |

INFORMATION PROCESSING DEVICE FOR ANALYZING A SPECIMEN

CROSS REFERENCE TO RELATED APPLICATIONS

This application is a U.S. National Phase of International Patent Application No. PCT/JP2020/020809 filed on May 26, 2020, which claims priority benefit of Japanese Patent Application No. JP 2019-127994 filed in the Japan Patent Office on Jul. 9, 2019. Each of the above-referenced applications is hereby incorporated herein by reference in its entirety.

FIELD

The present disclosure relates to an information processing device and a program.

BACKGROUND

A technique for analyzing a specimen using a fluorescence image of the specimen is disclosed. For example, a technique for analyzing a type, a size, and the like of a cell by analyzing a fluorescence signal or a fluorescence spectrum is known (for example, Patent Literature 1 and Patent Literature 2).

CITATION LIST

Patent Literature

Patent Literature 1: JP 2005-91895 A
Patent Literature 2: JP 2015-145829 A

SUMMARY

Technical Problem

However, the fluorescence image has a factor that affects an analysis caused by autofluorescence, light absorption, or the like derived from a substance contained in the specimen. For this reason, in the related art, it is sometimes difficult to analyze a specimen with high accuracy.

Therefore, the present disclosure proposes an information processing device and a program capable of analyzing a specimen with high accuracy.

Solution to Problem

To solve the above-described problem, an information processing device according to one aspect of the present disclosure comprises: an extraction unit that extracts fluorescence correction information from a bright visual field image of a specimen; and a generation unit that generates a fluorescence correction image based on fluorescence information of the specimen and the fluorescence correction information.

BRIEF DESCRIPTION OF DRAWINGS

FIG. 7 is a diagram illustrating a spectrum of a fluorescent dye according to an embodiment of the present disclosure.

FIG. 9 is a diagram illustrating a positional relationship between tumor cells and lymphocytes and a stained state according to an embodiment of the present disclosure.

DESCRIPTION OF EMBODIMENTS

Figure 1A:
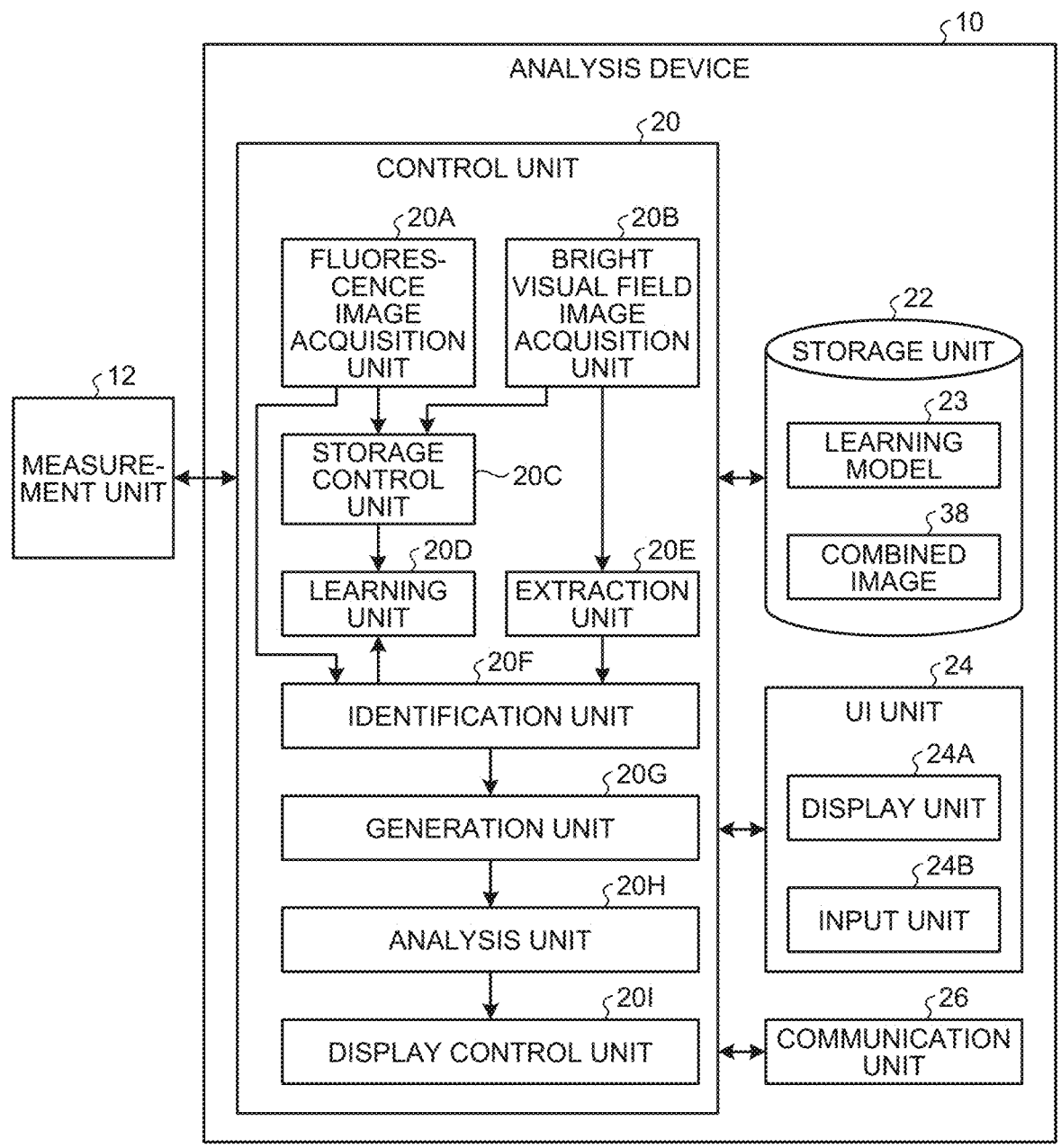
FIG. 1A is a schematic diagram illustrating an example of an information processing device according to an embodiment of the present disclosure.

Hereinafter, the embodiments of the present disclosure will be described in detail with reference to the drawings. In the following embodiments, the same parts are designated by the same reference numerals, so that duplicate description will be omitted.

FIG. 1A is a schematic diagram illustrating an example of an information processing device 1 according to the present embodiment.

The information processing device 1 includes an analysis device 10 and a measurement unit 12. The analysis device 10 and the measurement unit 12 are connected so as to be able to exchange data or signals.

The measurement unit 12 photographs a specimen and obtains a bright visual field image and a fluorescence image of the specimen.

The specimen is a sample to be analyzed by the analysis device 10. The specimen is, for example, a tissue specimen used for pathological diagnosis or the like. Specifically, the specimen is a tissue of an organism including tumor cells, lymphocytes (T cells, B cells, natural killer cells (NK cells)), and the like. The specimen may also be a sample including one or a plurality of complexes of proteins, amino acids, carbohydrates, lipids, and modified molecules thereof. In addition, the specimen may be a sample including an antigen (tumor markers, signal transducers, hormones, cancer growth regulators, metastasis regulators, growth regulators, inflammatory cytokines, virus-related molecules, etc.) associated with a disease to be subjected to pathological diagnosis. In addition, the specimen may be a sample including a metabolite, deoxyribonucleic acid (DNA), ribonucleic acid (RNA), microRNA, polynucleotide, toxin, drug, virion, cell, hemoglobin, or the like. Note that the specimen is not limited to the above. For example, the specimen may be a sample other than a tissue of a living body. For example, the specimen may be a non-biological sample composed of a plurality of molecules.

In the present embodiment, a case where the specimen is a tissue of an organism will be described as an example.

The bright visual field image is a photographed image of the specimen. The photographed image is photographed image data in which a pixel value is defined for each pixel. That is, the bright visual field image is photographed image data in which a color value is defined for each pixel. The color value is represented by, for example, a gradation value of each of red (R), green (G), and blue (B). Hereinafter, the photographed image data will be simply referred to as a photographed image.

In the present embodiment, a stained specimen is used at the time of photographing a bright visual field image. The stained specimen specifically includes a specimen stained with hematoxylin eosin (HE). The measurement unit 12 obtains a bright visual field image which is a photographed image of light transmitted through or reflected by the HE stained specimen by photographing the specimen. The measurement unit 12 outputs the obtained bright visual field image to the analysis device 10.

The fluorescence image is a photographed image of a fluorescently stained specimen. Specifically, the bright visual field image is a photographed image in which a fluorescence intensity value is defined for each pixel.

The fluorescently stained specimen is a specimen in which a target included in the specimen is labeled or stained with a fluorescent dye. The target is, for example, an analysis target. The target is used for, for example, tumor, cell, pathological diagnosis, and the like.

The target is, for example, a tumor marker, a lymphocyte marker, an immune cell, an immune checkpoint molecule, a molecule serving as an index of a molecular target drug, a receptor, a cell surface marker, or the like. As these targets, for example, various antigens are used. The antigen is, for example, CD3, CD20, CD68, or the like. For fluorescent labeling of these antigens, a known antibody fluorescently labeled with a known fluorescent dye such as fluorescein isothiocyanate (FITC) may be used. In addition, there is a method of accumulating a fluorescent dye by using an enzyme, but the method is not limited thereto. Examples thereof include nucleic acids such as DNA and RNA. Examples of the fluorescent dye used for staining these specific tissues include DAPI (4′,6-diamino-2-phenylindole (DAPI), Alexa Fluor (registered trademark) (AF) 405, Brilliant Violet (BV) 421, BV480, BV510, BV510, and the like.

The measurement unit 12 obtains a fluorescence image by irradiating a specimen in which a target is fluorescently stained with light (excitation light) in a wavelength region that excites fluorescence of a fluorescent dye and photographing the specimen. A known mechanism may be used as the light irradiation and photographing mechanism. The measurement unit 12 outputs the obtained fluorescence image to the analysis device 10.

Figure 1B:
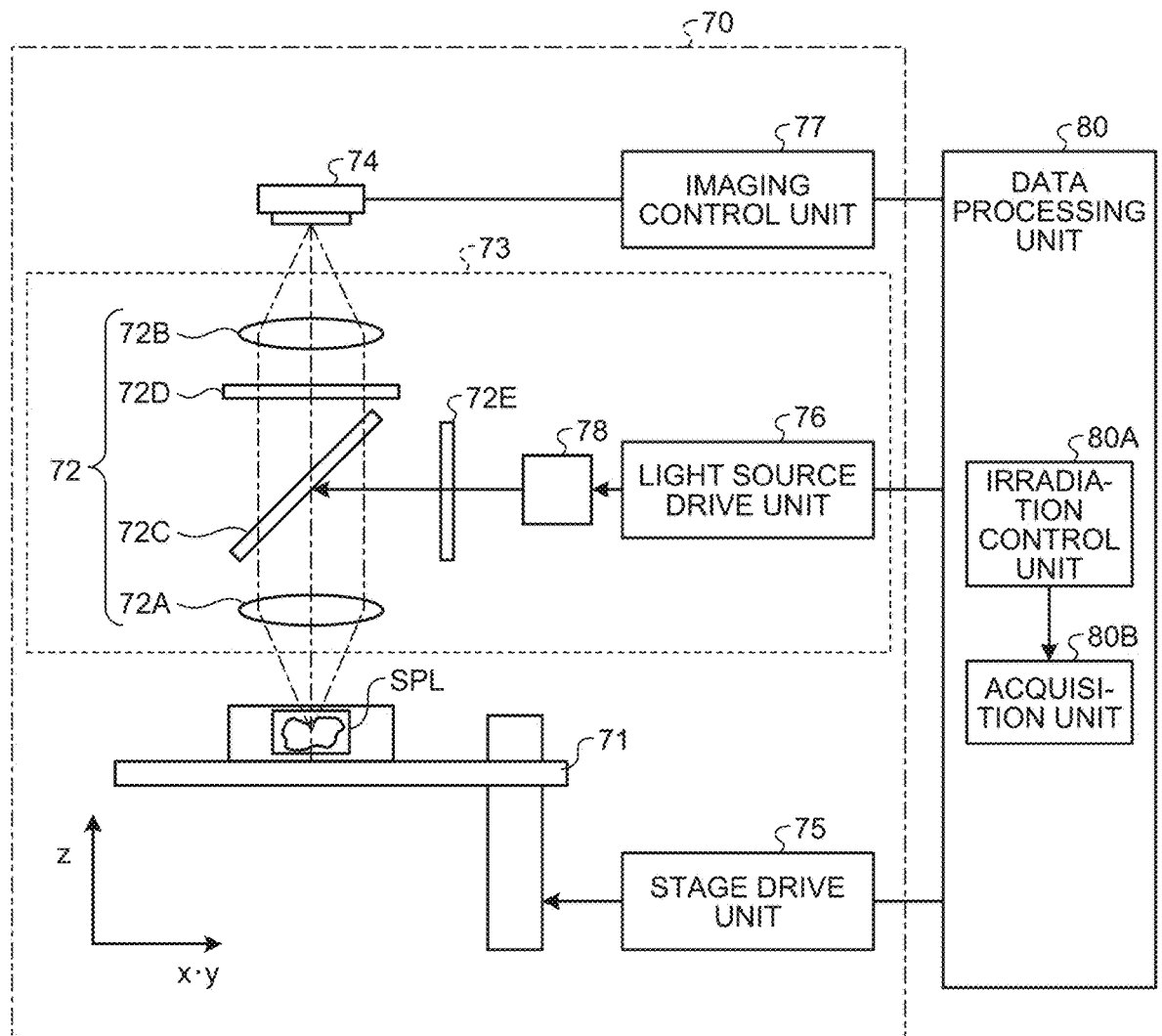
FIG. 1B is a schematic diagram illustrating an example of a measurement unit according to an embodiment of the present disclosure.

FIG. 1B is a schematic diagram illustrating an example of a specific configuration of the measurement unit 12. The measurement unit 12 is a microscope system that photographs a specimen in an enlarged state.

The measurement unit 12 includes a microscope 70 and a data processing unit 80.

The microscope 70 includes a stage 71, an irradiation unit 73, and an imaging element 74. The stage 71 has a placement face on which a sample SPL as a specimen can be placed. The stage 71 is movable in a parallel direction (x-y plane direction) and a vertical direction (z-axis direction) under the control of a stage drive unit 75.

The irradiation unit 73 irradiates the specimen with excitation light. The irradiation unit 73 includes an optical system 72, a light source drive unit 76, and a light source 78.

The optical system 72 is disposed above the stage 71. The optical system 72 includes an objective lens 72A, an imaging lens 72B, a dichroic mirror 72C, an emission filter 72D, and an excitation filter 72E. The light source 78 is, for example, a light bulb such as a mercury lamp, a light emitting diode (LED), or the like.

The excitation filter 72E is a filter that selectively transmits light in a wavelength region that excites fluorescence of a fluorescent dye among the light emitted from the light source 78. The microscope 70 is equipped with a plurality of excitation filters 72E having different wavelength regions the light in which is transmitted.

The dichroic mirror 72C guides the light emitted from a light source 78 and transmitted through the excitation filter 72E to the objective lens 72A. The objective lens 72A condenses the light on the sample SPL. Then, the objective lens 72A and the imaging lens 72B form an enlarged image obtained by enlarging the image of the sample SPL to a predetermined magnification on the imaging face of the imaging element 74.

The light source drive unit 76 controls the light source 78 and controls switching of excitation filter 72E.

The imaging element 74 obtains a photographed image of the specimen. An enlarged image of the specimen is formed on the imaging element 74 via the objective lens 72A and the imaging lens 72B. The imaging element 74 obtains a photographed image obtained by enlarging the specimen by this imaging.

The imaging element 74 is an imager that has a photoelectric conversion element and obtains an image from incident light. The imaging element 74 has an image device such as a charge coupled device (CCD) or a complementary metal oxide semiconductor (CMOS) image sensor, or the like. Note that the imaging lens 72B and the emission filter 72D may be changed to spectroscopic elements. In this case, a spectral camera of a run scan type which is a spatial scanning type or a two-dimensional spectral camera of a time scanning type is used.

The imaging element 74 acquires a photographed image obtained by photographing the specimen under the control of an imaging control unit 77 to output the photographed image to the data processing unit 80.

The data processing unit 80 includes an irradiation control unit 80A and an acquisition unit 80B. The irradiation control unit 80A controls the irradiation unit 73. Under the control of the irradiation control unit 80A, the light source drive unit 76 controls the position of the excitation filter 72E such that the light emitted from the light source 78 is transmitted through the excitation filter 72E, and then causes the light source 78 to emit light.

The acquisition unit 80B acquires the photographed image of the specimen from the imaging control unit 77. Specifically, the acquisition unit 80B acquires the bright visual field image by acquiring the photographed image of the stained specimen. In addition, the acquisition unit 80B acquires a fluorescence image by acquiring a photographed image captured in a state where the specimen in which the target is fluorescently stained is irradiated with excitation light. Then, the acquisition unit 80B outputs the fluorescence image and the bright visual field image to the analysis device 10.

Returning to FIG. 1A, the description will be continued. The analysis device 10 is an analysis device that analyzes a specimen.

The analysis device 10 includes a control unit 20, a storage unit 22, a user interface (UI) unit 24, and a communication unit 26. The control unit 20, the storage unit 22, the UI unit 24, and the communication unit 26 are connected so as to be able to exchange data or signals.

The storage unit 22 stores various pieces of data. In the present embodiment, the storage unit 22 stores various pieces of data such as a learning model 23 and a combined image 38. Details of the learning model 23 and the combined image 38 will be described later.

The UI unit 24 receives various operation inputs by the user to output various types of information. In the present embodiment, the UI unit 24 includes a display unit 24A and an input unit 24B.

The display unit 24A displays various types of information. The display unit 24A is, for example, an organic electro-luminescence (EL), a liquid crystal display (LCD), or the like. The input unit 24B receives various operation inputs by the user. The input unit 24B is, for example, a pointing device, a mouse, a keyboard, an input button, or the like. Note that the display unit 24A and the input unit 24B may be integrally configured as a touch panel.

The communication unit 26 is a communication interface that communicates with an external device via a network in a wired or wireless manner.

The control unit 20 includes a fluorescence image acquisition unit 20A, a bright visual field image acquisition unit 20B, a storage control unit 20C, a learning unit 20D, an extraction unit 20E, an identification unit 20F, a generation unit 20G, an analysis unit 20H, and a display control unit 20I. Some or all of the fluorescence image acquisition unit 20A, the bright visual field image acquisition unit 20B, the storage control unit 20C, the learning unit 20D, the extraction unit 20E, the identification unit 20F, the generation unit 20G, the analysis unit 20H, and the display control unit 20I may be realized by causing a processing device such as a central processing unit (CPU) to execute a program, that is, by software, may be realized by hardware such as an integrated circuit (IC), or may be realized by using software and hardware in combination.

The fluorescence image acquisition unit 20A acquires a fluorescence image including fluorescence information of a specimen. The fluorescence information is information about a fluorescently stained specimen. For example, the fluorescence image acquisition unit 20A acquires a fluorescence image from the measurement unit 12. Note that the fluorescence image acquisition unit 20A may acquire the fluorescence image by reading the fluorescence image stored in the storage unit 22.

The bright visual field image acquisition unit 20B acquires a bright visual field image. For example, the bright visual field image acquisition unit 20B acquires the bright visual field image from the measurement unit 12. Note that the bright visual field image acquisition unit 20B may acquire the bright visual field image by reading the bright visual field image stored in the storage unit 22.

Note that the fluorescence image acquisition unit 20A and the bright visual field image acquisition unit 20B acquire the fluorescence image and the bright visual field image, respectively, as the photographed images of the identical specimen. That is, the fluorescence image acquired by the fluorescence image acquisition unit 20A and the bright visual field image acquired by the bright visual field image acquisition unit 20B are photographed images of the identical specimen. Note that the fluorescence image acquisition unit 20A and the bright visual field image acquisition unit 20B may acquire the fluorescence image and the bright visual field image, respectively, for the identical tissue section of the identical specimen. In addition, the fluorescence image acquisition unit 20A and the bright visual field image acquisition unit 20B may acquire the fluorescence image and the bright visual field image, respectively, for different tissue sections of the identical specimen. In this case, it is preferable that the fluorescence image acquisition unit 20A and the bright visual field image acquisition unit 20B acquire the fluorescence image and the bright visual field image, respectively, for each of the continuous sections of the identical specimen. That is, the specimen is preferably an identical section or continuous tissue sections.

As described above, in the present embodiment, each of the fluorescence image and the bright visual field image can be acquired using the identical specimen or specimens similar to each other. At this time, as a specimen identical or similar to a certain specimen, it is also possible to use any section of a non-stained section and a stained section. For example, when a non-stained section is used, it is also possible to use a section before staining used as a stained section, a section adjacent to the stained section, a section different from the stained section in the identical block (sampled from the place same as that of the stained section), a section in a different block (sampled from a different place from the stained section) in the identical tissue, or the like.

In the present embodiment, a mode in which the fluorescence image acquisition unit 20A and the bright visual field image acquisition unit 20B acquire a fluorescence image and a bright visual field image, respectively, for the identical tissue section of the identical specimen will be described as an example. Hereinafter, the tissue section may be simply referred to as a section.

Figure 2:
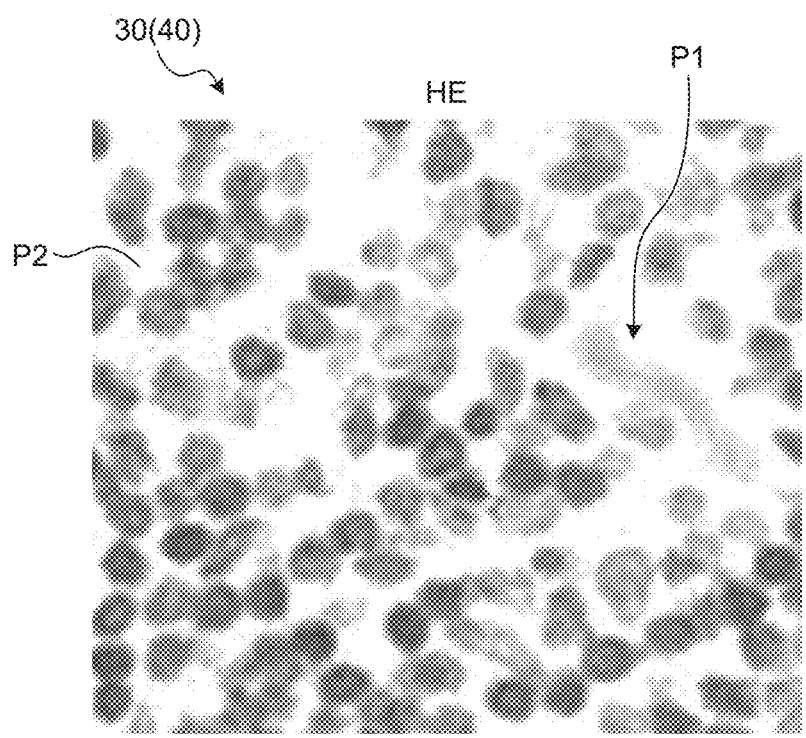
FIG. 2 is a diagram illustrating an example of a bright visual field image according to an embodiment of the present disclosure.

FIG. 2 is a diagram illustrating an example of a bright visual field image 30. FIG. 2 illustrates an example of a bright visual field image 30 of a section of a specimen 40 which is a living tissue. In the present embodiment, a case where the specimen 40 includes a component that emits autofluorescence will be described. Examples of the component that emits autofluorescence are a red blood cell, a vascular endothelium, a necrotic area, a fatty area, collagen, elastin, debris, dirt, contamination, an artifact, and the like. On the other hand, the component that absorbs fluorescence as the light absorption region is carbon powder or the like.

Figure 3A:
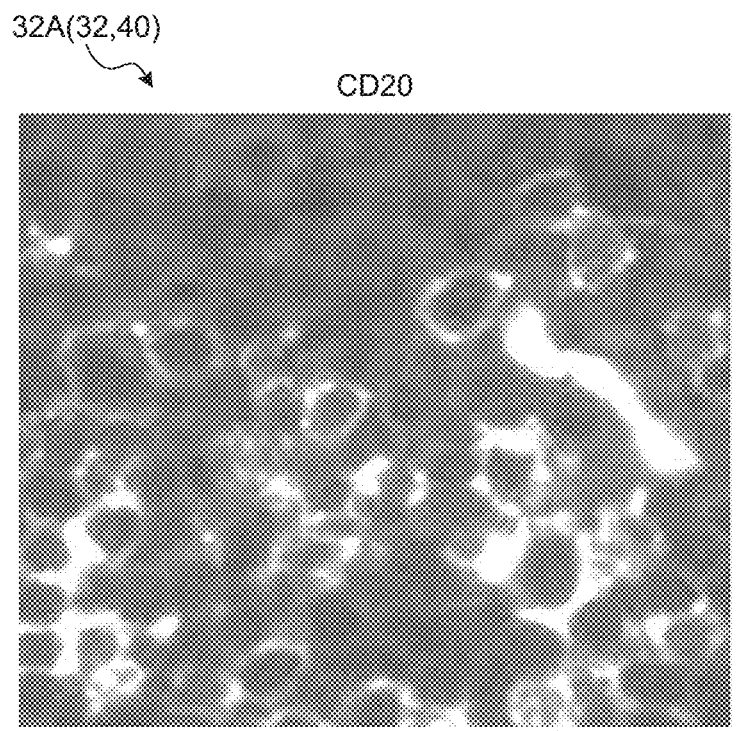
FIG. 3A is a diagram illustrating an example of a fluorescence image according to an embodiment of the present disclosure.
Figure 3B:
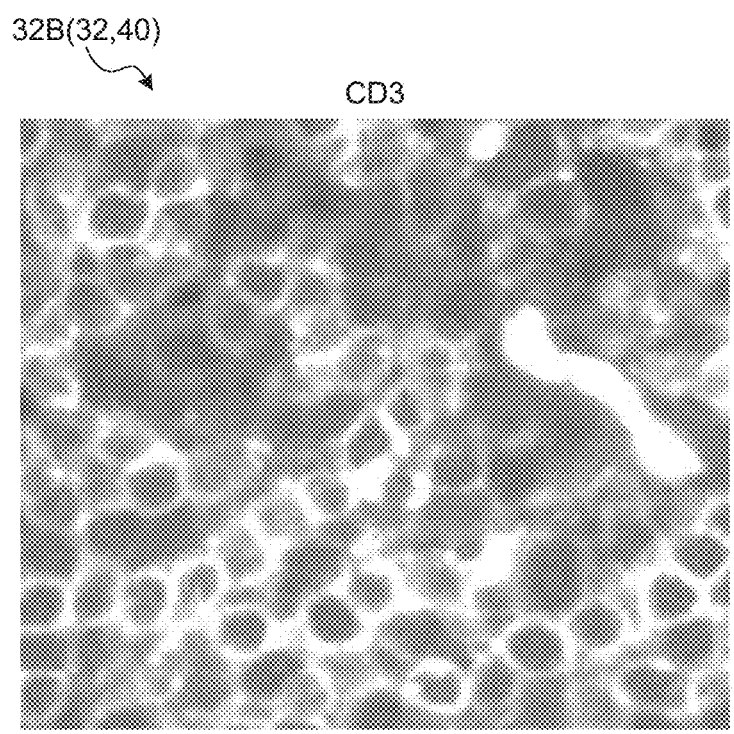
FIG. 3B is a diagram illustrating an example of a fluorescence image according to an embodiment of the present disclosure.
Figure 3C:
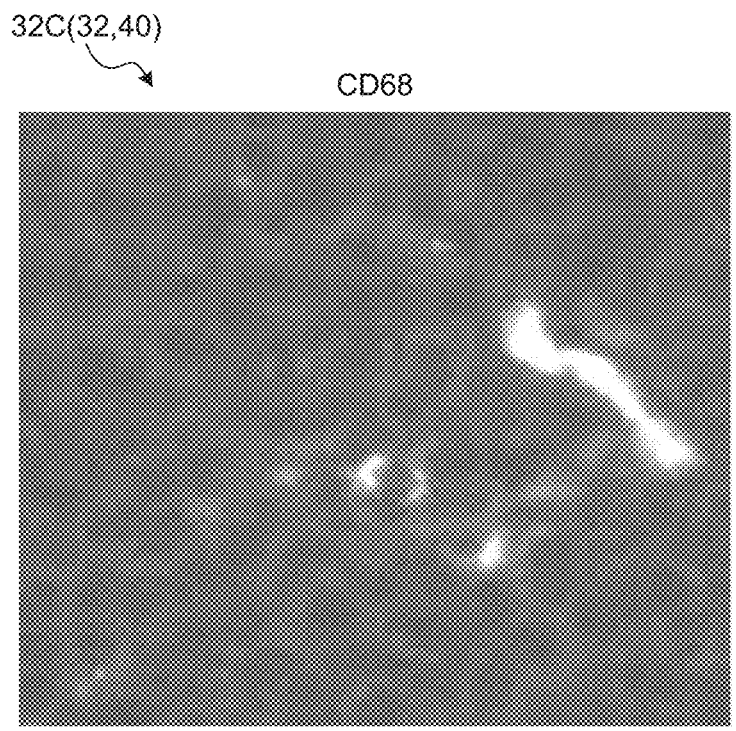
FIG. 3C is a diagram illustrating an example of a fluorescence image according to an embodiment of the present disclosure.

FIGS. 3A, 3B, 3C and, 3D are diagrams illustrating an example of a fluorescence image 32.

FIG. 3A is an image illustrating a fluorescence image 32A. The fluorescence image 32A is the fluorescence image 32 of a section of the specimen 40 in which a cluster of differentiation (CD) 20 that is an antigen is fluorescently labeled using a fluorescently labeled antibody having specificity for the CD20.

FIG. 3B is an image illustrating a fluorescence image 32B. The fluorescence image 32B is the fluorescence image 32 of a section of the specimen 40 in which the CD3 as an antigen is fluorescently labeled using a fluorescently labeled antibody having specificity for the CD3.

FIG. 3C is an image illustrating a fluorescence image 32C. The fluorescence image 32C is the fluorescence image 32 of a section of the specimen 40 in which the CD68 as an antigen is fluorescently labeled using a fluorescently labeled antibody having specificity for the CD68.

Figure 3D:
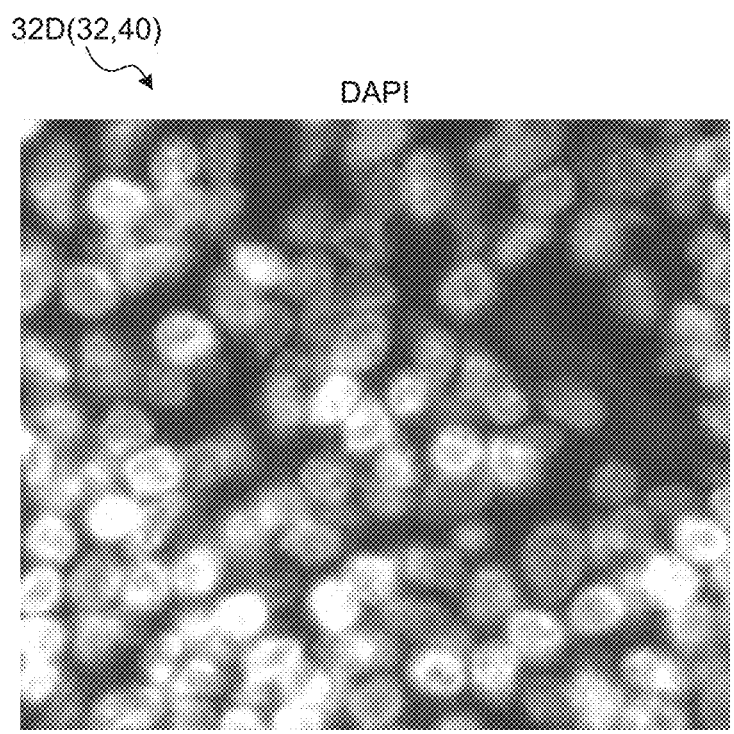
FIG. 3D is a diagram illustrating an example of a fluorescence image according to an embodiment of the present disclosure.

FIG. 3D is an image illustrating a fluorescence image 32D. The fluorescence image 32D is the fluorescence image 32 of a section of the specimen 40 in which a specific tissue such as DNA or RNA nucleic acid is fluorescently stained with DAPI (4',6-diamidino-2-phenylindole).

Note that FIGS. 3A, 3B, 3C and, 3D illustrate fluorescence images 32 for the identical section of the specimen 40 corresponding to the bright visual field image 30 illustrated in FIG. 2.

Specifically, both the bright visual field image 30 and the fluorescence image 32 (fluorescence image 32A to fluorescence image 32D) are photographed images obtained by photographing the identical section of the identical specimen 40. However, at the time of photographing the bright visual field image 30, the section may be at least HE stained. Furthermore, at the time of photographing the fluorescence image 32, the section is fluorescently stained with a fluorescent dye (or a fluorescently labeled antigen) having specificity for each of a plurality of targets different from each other (antigen, specific tissue), and photographed in a state of being irradiated with light in a wavelength region where the fluorescent dye excites.

Returning to FIG. 1A, the description will be continued. The storage control unit 20C stores the fluorescence image 32 acquired by the fluorescence image acquisition unit 20A and the bright visual field image 30 acquired by the bright visual field image acquisition unit 20B in the storage unit 22 in association with each other for the identical specimen 40.

For example, identification information (such as a barcode) of the specimen 40 is given to a slide on which a section of the specimen 40 used for photographing each of the bright visual field image 30 and the fluorescence image 32 is placed. Then, the measurement unit 12 may photograph the identification information and each of the bright visual field image 30 and the fluorescence image 32 at the time of photographing the specimen 40. The storage control unit 20C may store the bright visual field image 30 and the fluorescence image 32 in the storage unit 22 for each specimen 40 by identifying the bright visual field image 30 and the fluorescence image 32 having the same identification information.

Therefore, every time the fluorescence image acquisition unit 20A and the bright visual field image acquisition unit 20B acquire the fluorescence image 32 and the bright visual field image 30, the fluorescence image 32 and the bright visual field image 30 corresponding to the specimen 40 are sequentially stored in the storage unit 22.

Note that the storage control unit 20C may generate the combined image 38 using the bright visual field image 30 and the fluorescence image 32 for each specimen 40 and store the combined image in the storage unit 22.

Figure 4:
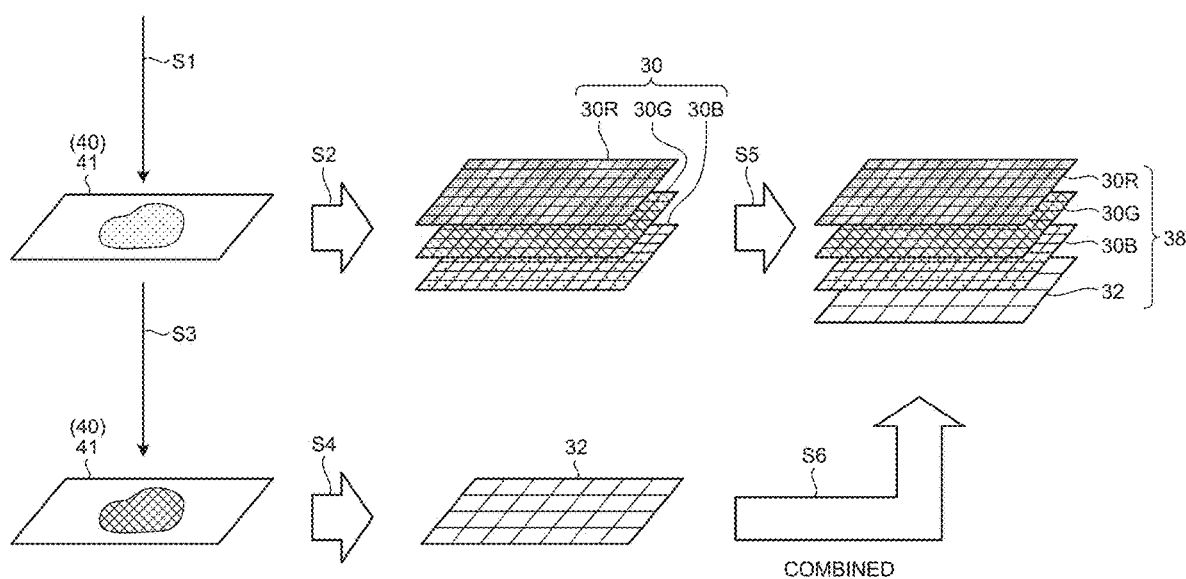
FIG. 4 is an explanatory diagram of an example of generation of a combined image according to an embodiment of the present disclosure.

FIG. 4 is an explanatory diagram of an example of generation of the combined image 38.

The combined image 38 is an image in which the color value of the bright visual field image 30 and the fluorescence intensity value of the fluorescence image 32 are defined for each pixel. Specifically, the combined image 38 is an image obtained by combining the bright visual field image 30 and the fluorescence image 32 for each corresponding pixel. The corresponding pixel means a pixel indicating the identical region at the identical position in the identical section 41 of the identical specimen 40. Therefore, the plurality of images (bright visual field image 30, fluorescence image 32) constituting the combined image 38 is preferably photographed images of the identical region of the identical section 41 except that at least one of the staining condition and the photographing condition is different.

For example, it is assumed that the bright visual field image 30 is constituted by the bright visual field image 30 (a bright visual field image 30R, a bright visual field image 30G, and a bright visual field image 30B) of three channels of red (R), green (G), and blue (B). The bright visual field image 30R is the bright visual field image 30 in which a color value of red (R) is defined for each pixel. The bright visual field image 30G is the bright visual field image 30 in which a color value of green (G) is defined for each pixel. The bright visual field image 30B is the bright visual field image 30 in which a color value of B (blue) is defined for each pixel.

For example, the section 41 of HE-stained specimen 40 is adjusted (Step S1). When the measurement unit 12 photographs the section 41, the bright visual field image acquisition unit 20B acquires the bright visual field image 30 (bright visual field image 30R, bright visual field image 30G, and bright visual field image 30B) of the section 41 (Step S2).

Further, the section 41 of the fluorescently stained specimen 40 is adjusted (Step S3). The measurement unit 12 irradiates the section 41 with light having a wavelength that excites fluorescence, and photographs the section 41. At this time, the measurement unit 12 fluorescently stains the section 41 with a fluorescent dye according to each of the plurality of types of targets, and sequentially performs photographing in a state of sequentially emitting light having a wavelength that excites each fluorescent dye (Step S3, Step S4). As a result, the fluorescence image acquisition unit 20A acquires a plurality of fluorescence images 32 (for example, fluorescence image 32A to fluorescence image 32D) of the number of types of targets (Step S4).

The storage control unit 20C creates the combined image 38 in which the color value of the bright visual field image 30 and the fluorescence intensity value of the fluorescence image 32 are defined for each pixel for each specimen 40 (Step S5, Step S6). The storage control unit 20C generates the combined image 38 for each specimen 40 by associating the color value of the bright visual field image 30 with the fluorescence intensity value of the fluorescence image 32 for each pixel. Then, the storage control unit 20C stores the generated combined image 38 in the storage unit 22.

Therefore, the combined image 38 defining the color values of the three channels of R, G, and B defined by the bright visual field image 30 and the fluorescence intensity values of the number of channels same as the number of types of targets defined by the one or a plurality of fluorescence images 32 for regions corresponding to the pixels of the identical section 41 of the identical specimen 40 is stored in the storage unit 22 for each specimen 40.

The storage control unit 20C may generate the combined image 38 each time the bright visual field image 30 and the fluorescence image 32 of the new specimen 40 are stored in the storage unit 22. Note that the timing at which the storage control unit 20C generates the combined image 38 is not limited to this timing. For example, the storage control unit 20C may generate the combined image 38 using the bright visual field image 30 and the fluorescence image 32 stored in the storage unit 22 every predetermined period.

Returning to FIG. 1A, the description will be continued. When the combined image 38 is already stored in the storage unit 22, the fluorescence image acquisition unit 20A may acquire the fluorescence image 32 using the bright visual field image 30 acquired by the bright visual field image acquisition unit 20B and the combined image 38. In this case, the fluorescence image acquisition unit 20A may identify the fluorescence intensity value corresponding to each pixel of the bright visual field image 30 acquired by the bright visual field image acquisition unit 20B from the combined image 38 to acquire the fluorescence image 32 in which the fluorescence intensity value is defined for each pixel. That is, the fluorescence image acquisition unit 20A may acquire the fluorescence image 32 using the combined image 38 as a learning model.

Similarly, in a case where the combined image 38 is already stored in the storage unit 22, the bright visual field image acquisition unit 20B may acquire the bright visual field image 30 using the fluorescence image 32 acquired by the fluorescence image acquisition unit 20A and the combined image 38. In this case, the bright visual field image acquisition unit 20B may identify the color value corresponding to each pixel of the fluorescence image 32 acquired by the fluorescence image acquisition unit 20A from the combined image 38 to acquire the bright visual field image 30 in which the color value is defined for each pixel.

That is, the bright visual field image acquisition unit 20B may acquire the bright visual field image 30 using the combined image 38 as a learning model. Specifically, the fluorescence information of the combined image 38 may be learned as teacher data to acquire the bright visual field image 30. According to the present embodiment, since the bright visual field image and the fluorescence information derived from the identical section are accurately associated on a pixel basis, it is possible to acquire the bright visual field image from the fluorescence information with high accuracy. Preferably, the fluorescence information may include information about fluorescence in situ hybridization (FISH).

Next, the extraction unit 20E will be described. The extraction unit 20E extracts fluorescence correction information from the bright visual field image 30 of the specimen 40. The fluorescence correction information is information selected from color information of the bright visual field image 30, morphological information of the bright visual field image 30, or staining information of the bright visual field image 30. The morphological information of the bright visual field image 30 is information indicating a position, a size, and a range of the region indicating each color included in the bright visual field image 30. The staining information of the bright visual field image 30 is information indicating the stained state of the specimen 40 in the bright visual field image 30. For example, the extraction unit 20E may extract the fluorescence correction information from the bright visual field image 30 by analyzing the bright visual field image 30 by a known image analysis method.

Next, the identification unit 20F will be described. The identification unit 20F identifies a correction target region of the bright visual field image 30 based on the fluorescence correction information extracted by the extraction unit 20E. As illustrated in FIG. 2, the identification unit 20F identifies a correction target region P1 included in the bright visual field image 30.

Figure 5:
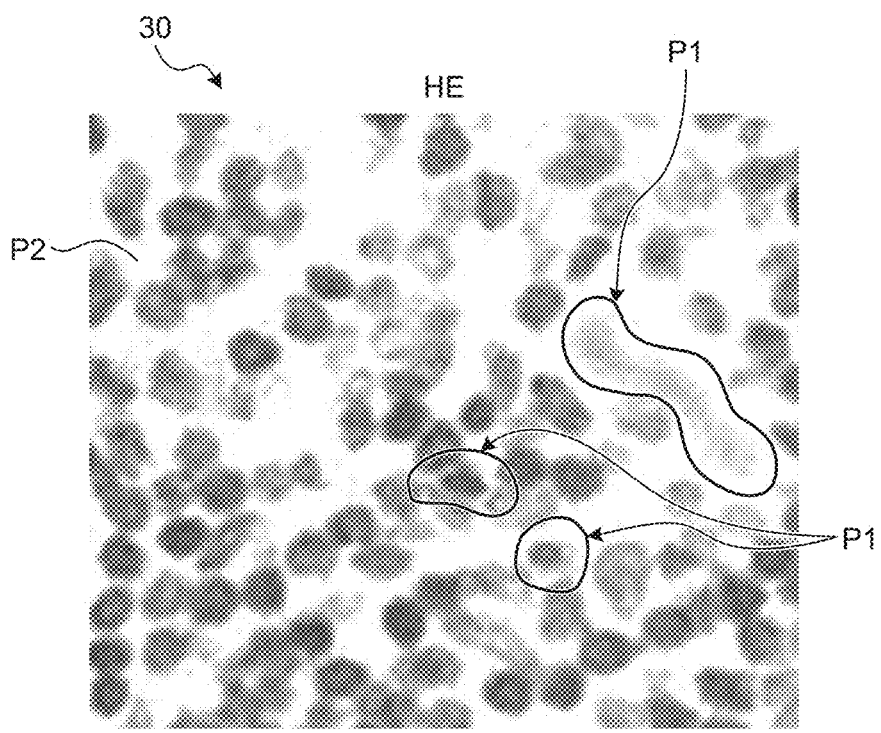
FIG. 5 is a diagram illustrating an example of a bright visual field image in which a correction target region is identified according to an embodiment of the present disclosure.

FIG. 5 is a diagram illustrating an example of the bright visual field image 30 in a state where the correction target region P1 is identified.

The correction target region P1 is a region to which auxiliary information is to be added. For example, the correction target region P1 is a region including information that hinders analysis by the analysis unit 20H, a region that urges a gaze, and the like. The correction target region P1 is, for example, an autofluorescence region or a light absorption region. The correction target region P1 may be determined according to the analysis content by the analysis unit 20H.

For example, it is assumed that the analysis content is the type, the distribution, the region, the size, the existing amount, and the like of the analysis target. In this case, the correction target region P1 is a region including a signal of autofluorescence, a spectrum of autofluorescence, carbon powder that absorbs light, or the like. Hereinafter, the signal of the autofluorescence may be referred to as an autofluorescence signal, and the spectrum of the autofluorescence may be referred to as an autofluorescence spectrum.

The identification unit 20F identifies the correction target region P1 corresponding to the analysis content in the entire region of the bright visual field image 30. For example, the identification unit 20F identifies the correction target region P1 of the bright visual field image 30 based on the fluorescence correction information extracted by the extraction unit 20E. Specifically, a region matching the feature information for identifying the correction target region P1 may be identified as the correction target region P1.

The feature information is information indicating the feature of the correction target region P1. The feature information is, for example, information indicating a feature of an autofluorescence signal and information indicating a feature of an autofluorescence spectrum. The information indicating the feature of the autofluorescence signal is, for example, information indicating the wavelength and intensity of the autofluorescence signal. The autofluorescence signal itself may be used as the feature information. The information indicating the feature of the autofluorescence spectrum is, for example, information indicating the peak position and the peak intensity of the autofluorescence spectrum. The autofluorescence spectrum itself may be used as the feature information. In addition, color information represented by the autofluorescence signal and the autofluorescence spectrum may be used as the feature information. The identification unit 20F may derive the feature information from the fluorescence correction information extracted by the extraction unit 20E.

Then, the identification unit 20F identifies the correction target region P1 based on the color value of each pixel of the bright visual field image 30. Specifically, the identification unit 20F may identify, as the correction target region P1, a region of a pixel in which the spectrum represented by the color value of each pixel matches the feature information or falls within a predetermined range among the pixels of the bright visual field image 30.

FIG. 5 and FIG. 2 illustrate, as an example, a case where the correction target region P1 is an autofluorescence region of autofluorescence by red blood cells.

Note that the identification unit 20F may identify the correction target region P1 by identifying morphological information indicating the position, the size, and the range of the correction target region P1 included in the bright visual field image 30. The position of the correction target region P1 indicates the position of the correction target region P1 in the bright visual field image 30. The size of the correction target region P1 indicates the size of the correction target region P1 in the bright visual field image 30. The range of the correction target region P1 indicates the range occupied by the correction target region P1 in the bright visual field image 30.

Note that it is assumed that a shooting angle and a shooting magnification of the bright visual field image 30 and the fluorescence image 32 obtained by photographing the identical specimen 40 are the same.

Then, the identification unit 20F stores the identified correction target region P1 in the storage unit 22 in association with the bright visual field image 30 used to identify the correction target region P1. Therefore, the storage unit 22 stores the bright visual field image 30, the fluorescence image 32 (fluorescence image 32A to fluorescence image 32D), and the morphological information of the correction target region P1 in association with each other for each specimen 40. Note that the process of storing the correction target region P1 in the storage unit 22 may be performed by the storage control unit 20C.

Returning to FIG. 1A, the description will be continued. The identification unit 20F may identify the correction target region P1 using the learning model 23. The learning model 23 is generated by the learning unit 20D.

The learning model 23 is a model with the bright visual field image 30 as an input and the correction target region P1 as an output. The learning unit 20D generates the learning model 23 by learning. A known algorithm such as a convolutional neural network (CNN) may be used for the learning.

The learning unit 20D learns and updates the learning model 23 at predetermined timing, for example. The predetermined timing is, for example, timing at which the new bright visual field image 30 and the new fluorescence image 32 are stored in the storage unit 22, timing at which the new correction target region P1 is stored in the storage unit 22, a predetermined period, a predetermined day, or the like. The predetermined timing may be determined in advance.

In a case where the learning model 23 has been registered in the storage unit 22, the identification unit 20F may identify the correction target region P1 by inputting the bright visual field image 30 acquired by the bright visual field image acquisition unit 20B to the learning model 23 as input data and acquiring the correction target region P1 output from the learning model 23.

Next, the generation unit 20G will be described. The generation unit 20G generates a fluorescence correction image based on the fluorescence information and the fluorescence correction information of the specimen 40. In the present embodiment, the generation unit 20G generates the fluorescence correction image obtained by correcting the correction target region P1 included in the fluorescence image 32 based on the fluorescence image 32 and the correction target region P1 identified based on the extracted fluorescence correction information.

The fluorescence correction image is a fluorescence image generated by correcting the correction target region P1 in the fluorescence image 32.

Figure 6A:
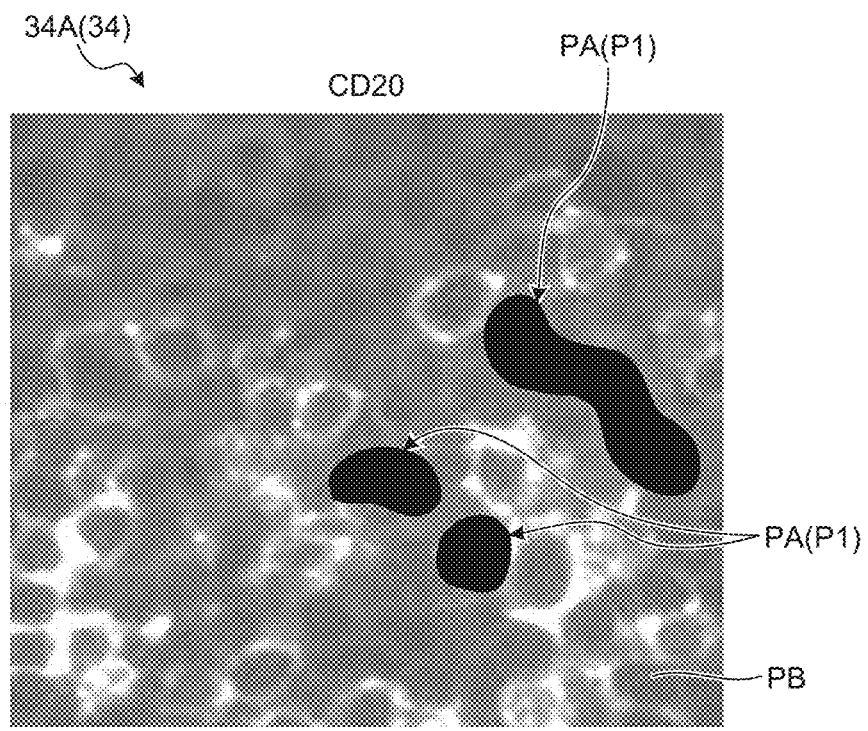
FIG. 6A is a diagram illustrating an example of a fluorescence correction image according to an embodiment of the present disclosure.
Figure 6B:
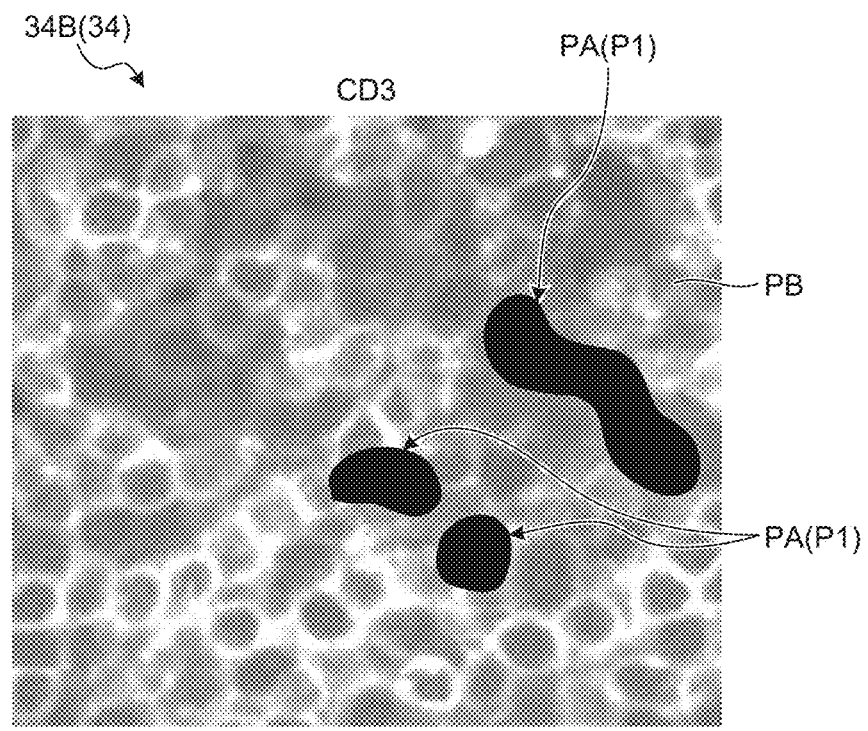
FIG. 6B is a diagram illustrating an example of a fluorescence correction image according to an embodiment of the present disclosure.
Figure 6C:
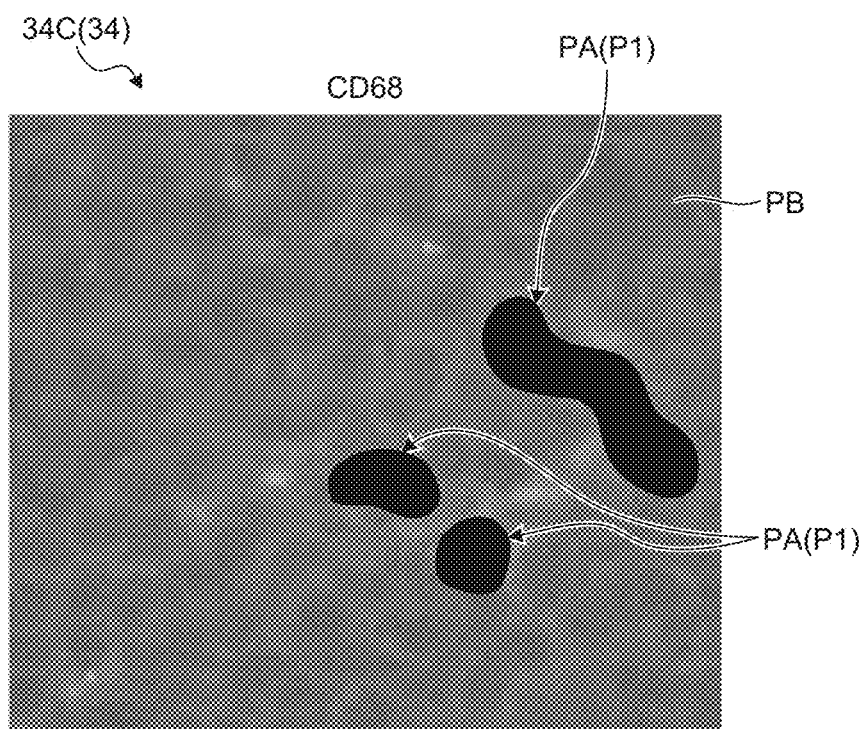
FIG. 6C is a diagram illustrating an example of a fluorescence correction image according to an embodiment of the present disclosure.
Figure 6D:
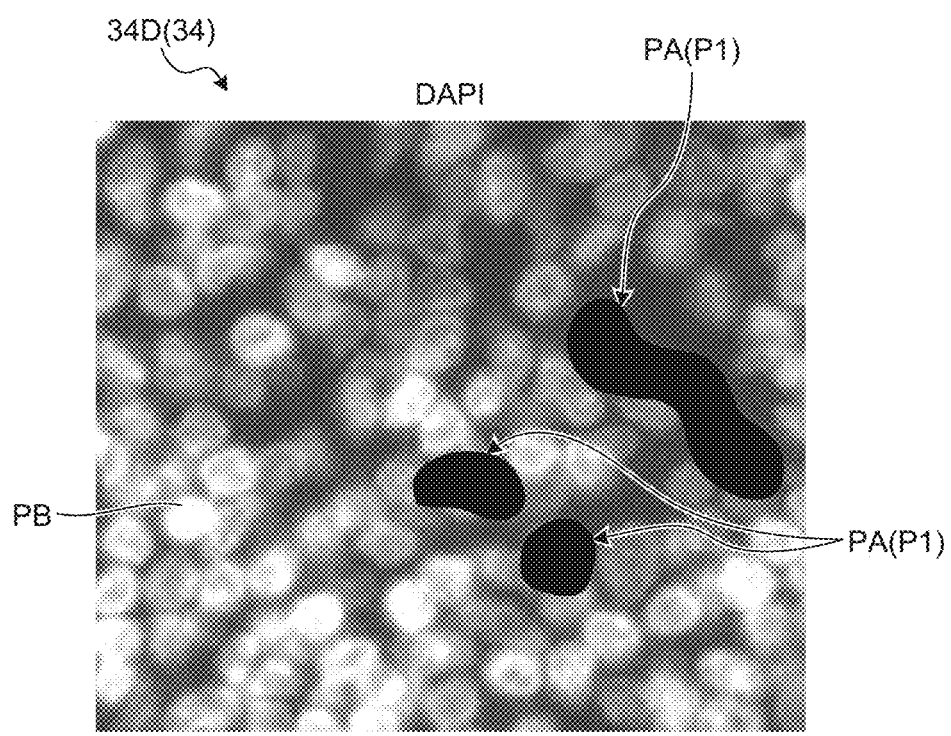
FIG. 6D is a diagram illustrating an example of a fluorescence correction image according to an embodiment of the present disclosure.

FIGS. 6A, 6B, 6C and, 6D are diagrams illustrating an example of a fluorescence correction image 34 (fluorescence correction image 34A to fluorescence correction image 34D). The fluorescence correction image 34A is a fluorescence image obtained by correcting a first region PA corresponding to the correction target region P1 of the fluorescence image 32A (see FIG. 3A). The fluorescence correction image 34B is a fluorescence image obtained by correcting the first region PA corresponding to the correction target region P1 of the fluorescence image 32B (see FIG. 3B). The fluorescence correction image 34C is a fluorescence image obtained by correcting the first region PA corresponding to the correction target region P1 of the fluorescence image 32C (see FIG. 3C). The fluorescence correction image 34D is a fluorescence image obtained by correcting the first region PA corresponding to the correction target region P1 of the fluorescence image 32D (see FIG. 3D).

The generation unit 20G identifies a region indicating the position, the size, and the range of the correction target region P1 identified by the identification unit 20F in the fluorescence correction image 34 as the correction target region P1 (that is, the first region PA) on the fluorescence correction image 34.

As described above, the bright visual field image 30 and the fluorescence image 32 obtained by photographing the identical specimen 40 have the same shooting angle and shooting magnification. In addition, it is assumed that the bright visual field image 30 and the fluorescence image 32 obtained by photographing the identical specimen 40 have the same region to be imaged in the specimen 40.

Therefore, the generation unit 20G may identify, as the first region PA corresponding to the correction target region P1, the region of the position, the size, and the range on the fluorescence image 32 defined by the position, the size, and the range of the correction target region P1 on the bright visual field image 30 identified by the identification unit 20F.

Then, a generation unit 20G corrects the fluorescence intensity value of each pixel in the identified first region PA in the fluorescence image 32.

That is, the generation unit 20G identifies the first region PA corresponding to the correction target region P1 of the bright visual field image 30 in the fluorescence image 32 by using the superimposed image in which the bright visual field image 30 and the fluorescence image 32 are superimposed, and corrects the first region PA.

For example, the generation unit 20G corrects the fluorescence intensity value in the first region PA included in the fluorescence image 32 to a lower value as the amount of fluorescence component caused by autofluorescence is higher.

Specifically, the generation unit 20G stores the autofluorescence spectrum in advance for each type of autofluorescence. The type of autofluorescence is, for example, a type of a component (red blood cells, collagen, elastin, and the like) that emits autofluorescence.

Then, the generation unit 20G reads the autofluorescence spectrum corresponding to the type of autofluorescence included in the section 41 of the fluorescence correction image 34. The type of autofluorescence may be input by the operation of the input unit 24B by the user, or may be identified by the generation unit 20G executing image analysis or the like by a known method. The generation unit 20G may generate the fluorescence correction image 34 by removing the autofluorescence spectrum from the spectrum of the color value of each pixel in the first region PA in the fluorescence image 32. For example, the generation unit 20G may generate the fluorescence correction image 34 by multiplying the spectrum of the color value of the nucleus pixel in the first region PA in the fluorescence image 32 by the weight value according to the autofluorescence spectrum.

At this time, the stored autofluorescence spectrum may be an autofluorescence spectrum of one channel. That is, there is a case where an autofluorescence spectrum of one channel obtained by synthesizing autofluorescence spectrum obtained from each of a plurality of fluorescence images 32 each including a plurality of types of fluorescently stained targets is stored.

In this case, the generation unit 20G may separate the autofluorescence spectrum into the number of channels (in this case, four channels) of the fluorescence image 32 (fluorescence image 32A to fluorescence image 32D). A known method may be used for the separation. Then, the generation unit 20G may generate each of the fluorescence correction image 34A to the fluorescence correction image 34D by correcting the first region PA of each of the fluorescence image 32A to the fluorescence image 32D corresponding to the fluorescently stained target using the separated autofluorescence spectrum corresponding to each target.

Note that the generation unit 20G may acquire a weight value according to the standard spectrum derived from the specimen from the learning model 23 and use the weight value for generating the fluorescence correction image 34.

In this case, the learning unit 20D may generate, as the learning model 23, a model with the bright visual field image 30 as an input and a weight value according to the correction target region P1 and the standard spectrum derived from the specimen as an output in advance. Then, the generation unit 20G acquires the weight value output from the learning model 23 by inputting the bright visual field image 30 to the learning model 23 as input data. Then, the generation unit 20G may correct the first region PA (correction target region P1) of the fluorescence image 32 using the acquired weight value to generate the fluorescence correction image 34. At this time, the generation unit 20G may generate the fluorescence correction image 34 obtained by removing the first region PA corresponding to the correction target region P1 corrected by the weight value.

In addition, the generation unit 20G may correct the fluorescence intensity value in the first region PA included in the fluorescence image 32 to be equal to or less than a predetermined threshold value (for example, "0"). This threshold value may be determined in advance. In this case, the generation unit 20G can generate the fluorescence correction image 34 obtained by removing the region corresponding to the correction target region P1.

Furthermore, the generation unit 20G may generate the fluorescence correction image 34 based on the peripheral information of the correction target region P1. For example, the generation unit 20G may correct the fluorescence intensity value in the first region PA included in the fluorescence image 32 using the fluorescence intensity value around the first region PA in the fluorescence image 32. Specifically, the generation unit 20G may generate the fluorescence correction image 34 by interpolating the fluorescence intensity value of the first region PA included in the fluorescence image 32 using the fluorescence intensity value of the pixel around the first region PA in the fluorescence image 32. A known image processing technique may be used for the interpolation.

Note that, as described above, for example, the generation unit 20G corrects the fluorescence intensity value in the first region PA included in the fluorescence image 32 to a lower value as the amount of fluorescence component caused by autofluorescence is higher. Therefore, the fluorescence intensity value necessary for analysis included in the fluorescence correction image 34 may also decrease due to the correction.

Therefore, it is preferable that the fluorescence image acquisition unit 20A acquires the fluorescence image 32 photographed under the photographing condition that the brightness of the correction target region P1 in the fluorescence image 32 is saturated. The photographing condition may be set in the measurement unit 12 in advance. For example, the photographing condition that the brightness of the correction target region P1 is saturated may be adjusted by adjusting the exposure time, the detector sensitivity, the intensity of the illumination light at the time of photographing, and the like.

As described above, the generation unit 20G identifies the first region PA corresponding to the correction target region P1 of the bright visual field image 30 in the fluorescence image 32 by using the superimposed image in which the bright visual field image 30 and the fluorescence image 32 are superimposed, and corrects the first region PA.

That is, the analysis device 10 of the present embodiment identifies the first region PA that is the correction target region P1 included in the fluorescence image 32 using the bright visual field image 30, and corrects the first region PA of the fluorescence image 32. Therefore, the analysis device 10 of the present embodiment can easily correct the correction target region P1 included in the fluorescence image 32 with high accuracy and set the first region PA as a region not to be analyzed or the like.

Note that the generation unit 20G may generate the fluorescence correction image 34 using the learning model 23. In this case, a model with the fluorescence information of the specimen 40 as an input and the fluorescence correction information as an output may be used as the learning model 23. In this case, the learning unit 20D may generate and update the learning model 23 by learning the correspondence between the fluorescence image 32 including the fluorescence information of the specimen 40 and the fluorescence correction information extracted by the extraction unit 20E at predetermined timing. Then, the generation unit 20G may generate the fluorescence correction image 34 based on the learning result by the learning unit 20D. Specifically, the generation unit 20G inputs the fluorescence image 32 acquired by the fluorescence image acquisition unit 20A to the learning model 23 as input data, and obtains the fluorescence correction information output from the learning model 23. The generation unit 20G may generate the fluorescence correction image 34 in the same manner as described above based on the obtained fluorescence correction information.

Here, among fluorescent dyes such as AF405, BV421, BV480, BV510, BV510, and DAPI, the spectrum of DAPI has a broad fluorescence wavelength. For this reason, in the related art, separation from signals caused by other fluorescent dyes is difficult in some cases.

FIG. 7 is a diagram illustrating spectra of fluorescent dyes. Line 36A illustrates the spectrum of AF405 and line 36B illustrates the spectrum of BV421. Line 36C illustrates the spectrum of DAPI. Line 36D illustrates the spectrum of BV480 and line 36E illustrates the spectrum of BV510.

As illustrated in FIG. 7, the spectrum of DAPI has a broad fluorescence wavelength, and in the related art, separation from signals caused by other fluorescent dyes is difficult.

On the other hand, in the present embodiment, the analysis device 10 identifies the first region PA corresponding to the correction target region P1 of the bright visual field image 30 in the fluorescence image 32 by using the superimposed image in which the bright visual field image 30 and the fluorescence image 32 are superimposed. Therefore, even when DAPI is used as the staining dye for obtaining the fluorescence image 32, the analysis device 10 of the present embodiment can accurately identify the correction target region P1 (first region PA). In addition, the analysis device 10 of the present embodiment can obtain the nucleus stained bright visual field image 30 without using an intercalator dye such as DAPI as a fluorescent dye. Therefore, when a display screen to be described later is displayed, it is possible to display a nucleus stained image according to the bright visual field image 30 on the fluorescence image 32 using the bright visual field image 30.

Note that the combined image 38 described above may further include the fluorescence correction image 34. In this case, the storage control unit 20C may create the combined image 38 in which the color value of the bright visual field image 30, the fluorescence intensity value of the fluorescence image 32, and the fluorescence intensity value of the fluorescence correction image 34 are defined for each pixel for each specimen 40.

Returning to FIG. 1A, the description will be continued. Next, the analysis unit 20H will be described. The analysis unit 20H analyzes the fluorescence correction image 34 and derives an analysis result. The analysis unit 20H may analyze the whole fluorescence correction image 34, or may separately analyze the first region PA and a second region PB included in the fluorescence correction image 34. Furthermore, without limited to the distinction between the first region PA and the second region PB, the analysis unit 20H may perform analysis for each region obtained by dividing the fluorescence correction image 34 according to at least one of the color value of the bright visual field image 30 and the fluorescence intensity value of the fluorescence correction image 34. For example, the analysis unit 20H may identify each of the regions of a specific cell included in the bright visual field image 30 using the color value of the bright visual field image 30 and analyze each of the regions of the characteristic cell in the fluorescence correction image 34.

The analysis result is information indicating an analysis result of the analysis content. The analysis unit 20H derives an analysis result by analyzing a distribution (fluorescence signal, fluorescence spectrum) of the fluorescence intensity value included in the fluorescence correction image 34 (fluorescence correction image 34A to fluorescence correction image 34D).

The analysis result is, for example, the type, the distribution, the region, the size, the existing amount, the score, and the like of the analysis target. The analysis target is the above-described target or the like. Specifically, the target is a tumor marker, a lymphocyte marker, an immune cell, an immune checkpoint molecule, and a specific tissue. In addition, the analysis target may be a tumor region, the target (immune cells, immune checkpoint molecules) present in the tumor region, the number of tumor cells, target positive tumor cells per the total number of tumor cells, and the like.

The existing amount of the analysis target, which is the analysis result, is represented by, for example, quantitative evaluation values such as the number of cells, the number of molecules, the cell density in the region, the molecular density in the region, the number of biomarker positive cells per the number of specific cells, and the ratio between the number of biomarker positive cells per the number of specific cells and the number of biomarker positive cells per the number of specific cells. The distribution and region of the analysis target, which is the analysis result, are represented by, for example, an intercellular distance, an intercellular interaction, and the like.

The analysis unit 20H may identify the analysis target by analyzing the bright visual field image 30. In this case, for example, the analysis unit 20H may identify the analysis target by a known image processing method based on the color value of each pixel of the bright visual field image 30G, the positional relationship of the pixels of each color value, and the like. Furthermore, the bright visual field image 30G may identify the analysis target based on the analysis target information input by the operation instruction of the input unit 24B by the user. Then, an analysis unit 20H may analyze the analysis target of the fluorescence correction image 34.

Note that analysis unit 20H may analyze the analysis target by a known method based on the distribution of the fluorescence intensity value of at least one of the first region PA and the second region PB that is a region other than the first region PA in the fluorescence correction image 34.

Furthermore, the analysis result may further include an analysis result of the bright visual field image 30. The analysis result of the bright visual field image 30 preferably includes, for example, information that is difficult to analyze from the fluorescence correction image 34. For example, the analysis result of the bright visual field image 30 includes, but is not limited to, a nucleus, an intracellular organelle, a cell membrane, a tissue stroma, a fat site, a necrotic area, carbon powder, and the like.

Here, as described above, the bright visual field image 30 and the fluorescence image 32 are not limited to the photographed image of the identical section 41 of the identical specimen 40, and may be photographed images of continuous sections of the identical specimen 40.

In this case, the section 41 used for the bright visual field image 30 and the section 41 used for the fluorescence image 32 are different sections 41 of the identical specimen 40. Therefore, an analysis result different from the actual state of the specimen 40 may be obtained.

For example, it is assumed that the analysis unit 20H derives the degree of infiltration of lymphocytes into tumor cells as an analysis result. In this case, the actual infiltration state of lymphocytes into tumor cells may be different from the infiltration state derived as the analysis result.

Therefore, in the analysis device 10 of the present embodiment, when different sections 41 (for example, continuous sections) of the identical specimen 40 are used as the bright visual field image 30 and the fluorescence image 32, it is preferable to use the sections 41 in the following stained state. Specifically, the analysis device 10 preferably uses sections 41 stained with HE and stained with a specific cell marker as the section 41 used for the bright visual field image 30 and the section 41 used for the fluorescence image 32.

Figure 8A:
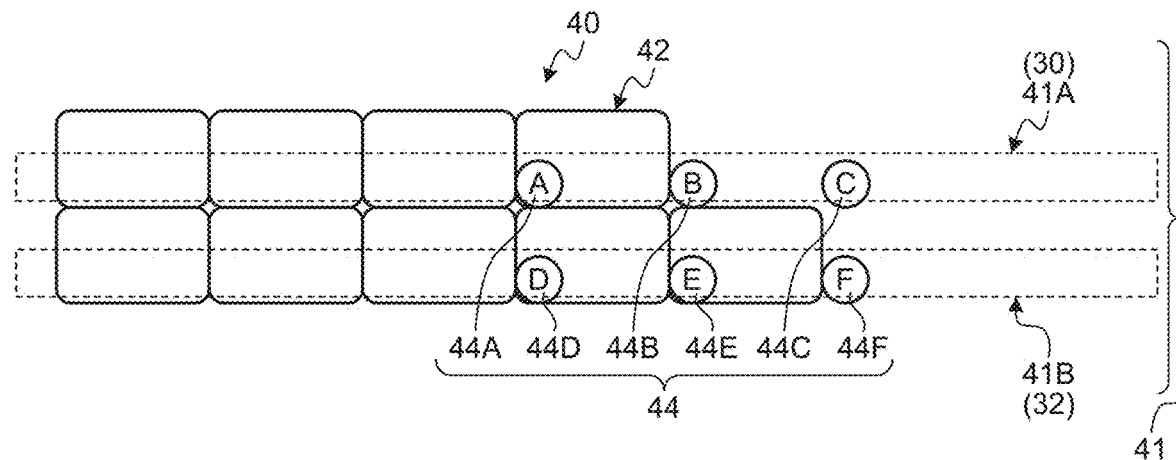
FIG. 8A is an explanatory diagram of an example of a stained state of a bright visual field image and a fluorescence image according to an embodiment of the present disclosure.
Figure 8B:
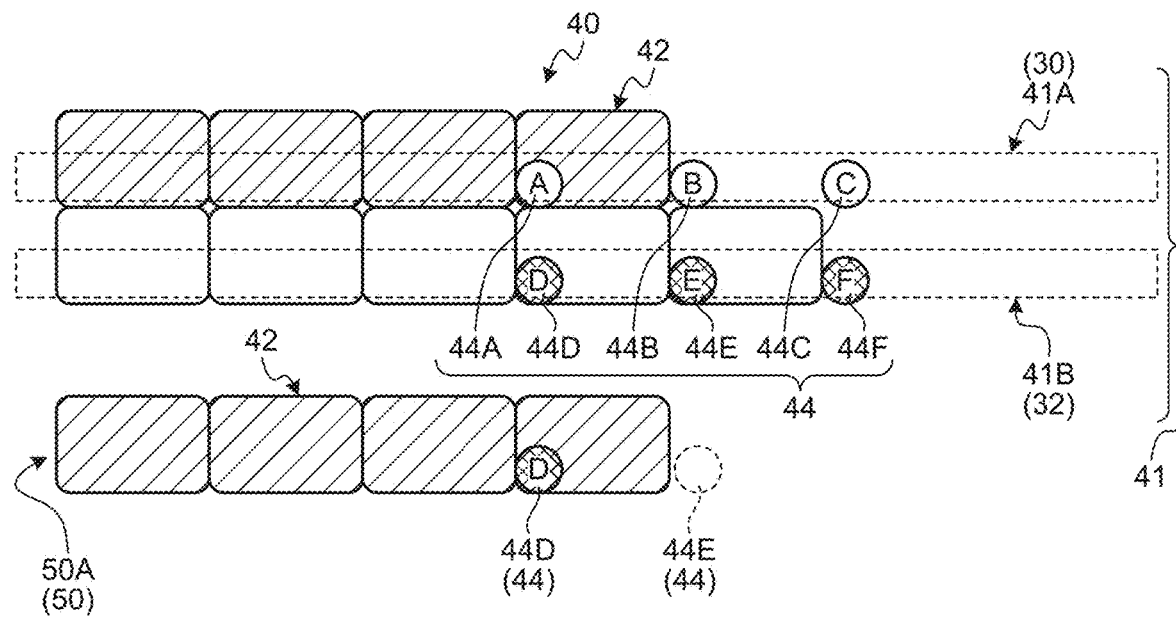
FIG. 8B is an explanatory diagram of an example of a stained state of a bright visual field image and a fluorescence image according to an embodiment of the present disclosure.
Figure 8C:
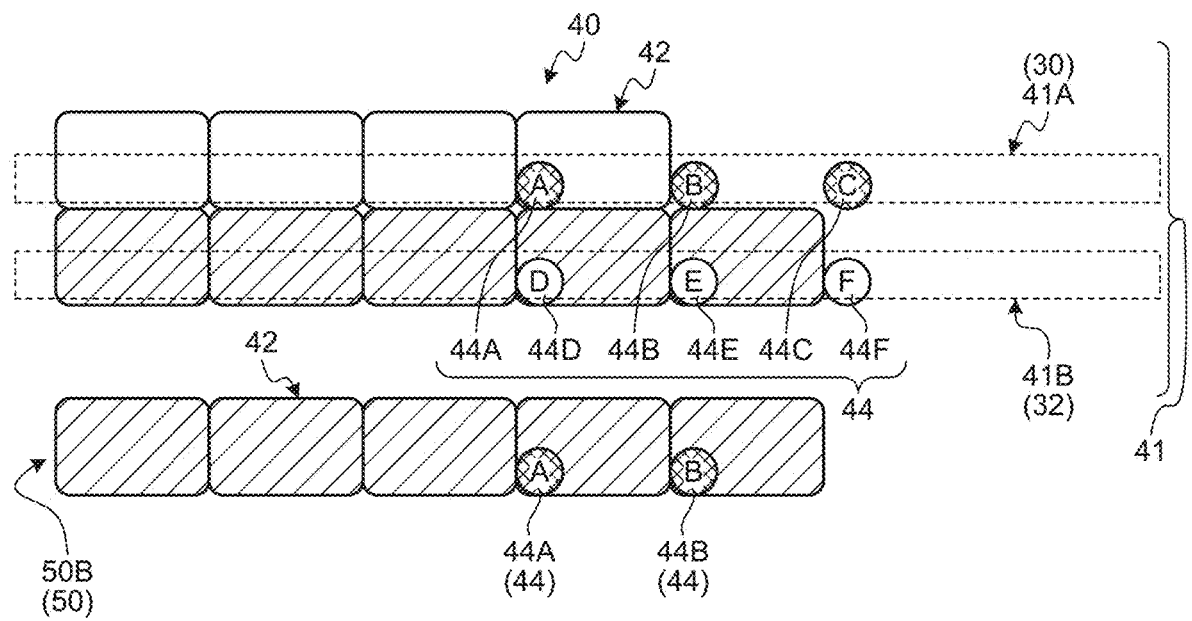
FIG. 8C is an explanatory diagram of an example of a stained state of a bright visual field image and a fluorescence image according to an embodiment of the present disclosure.

FIGS. 8A, 8B, 8C and, 8D are explanatory diagrams of an example of a stained state of the bright visual field image 30 and the fluorescence image 32. FIGS. 8A, 8B, 8C and, 8D illustrate a case where the specimen 40 is a living tissue and includes tumor cells 42 and a plurality of lymphocytes 44. The lymphocyte 44 is an example of a specific cell.

FIG. 8A is a diagram illustrating an example of a cross-sectional view of the specimen 40. As illustrated in FIG. 8A, it is assumed that the specimen 40 includes the tumor cells 42 and the lymphocytes 44. In addition, it is assumed that among the plurality of lymphocytes 44 (lymphocyte 44A to lymphocyte 44F), the lymphocyte 44A, the lymphocyte 44D, and the lymphocyte 44E are present in the tumor cells 42. In addition, among the plurality of lymphocytes 44, the lymphocyte 44B, the lymphocyte 44C, and the lymphocyte 44F are assumed to be present outside the tumor cells 42.

Then, it is assumed that the specimen 40 is cut to prepare a first section 41A and a second section 41B as the sections 41 continuous in the thickness direction. The first section 41A is an example of the section 41 used for photographing the bright visual field image 30. The second section 41B is an example of the section 41 used for photographing the fluorescence image 32.

Then, the first section 41A and the second section 41B are stained, and the measurement unit 12 photographs the stained first section 41A and second section 41B, thereby obtaining the bright visual field image 30 and the fluorescence image 32. Then, the generation unit 20G identifies the first region PA corresponding to the correction target region P1 of the bright visual field image 30 in the fluorescence image 32 by using the superimposed image in which the bright visual field image 30 and the fluorescence image 32 are superimposed.

FIGS. 8B, 8C and, 8D are explanatory diagrams of the stained state of the section 41. FIGS. 8B, 8C and, 8D illustrate different staining conditions.

FIG. 8B is an explanatory diagram of a superimposed image 50A of the bright visual field image 30 of the first section 41A in which the tumor cells 42 are HE-stained and the fluorescence image 32B of the second section 41B in which markers of lymphocytes 44 which are specific cells are stained with a fluorescent dye.

In this case, in the superimposed image 50A of the bright visual field image 30 and the fluorescence image 32, the lymphocyte 44E is present in the tumor cell 42. However, in the actual specimen 40, the lymphocyte 44E is present outside the tumor cell 42. Therefore, in this case, the generation unit 20G determines that the lymphocyte 44E actually present in the tumor cell 42 is the lymphocyte 44 present outside the tumor cell 42. Therefore, the actual infiltration state of the lymphocytes 44 into the tumor cells 42 is different from the infiltration state derived as the analysis result.

FIG. 8C is an explanatory diagram of a superimposed image 50B of the bright visual field image 30 of the first section 41A in which markers of lymphocytes 44 are stained with a fluorescent dye and the fluorescence image 32B of the second section 41B in which tumor cells 42 are HE-stained.

In this case, in the superimposed image 50B of the bright visual field image 30 and the fluorescence image 32, the lymphocyte 44B is present in the tumor cell 42. However, in the actual specimen 40, the lymphocyte 44B is present outside the tumor cell 42. Therefore, in this case, the generation unit 20G determines that the lymphocyte 44B that is not actually present in the tumor cell 42 is the lymphocyte 44 present in the tumor cell 42. Therefore, the actual infiltration state of the lymphocytes 44 into the tumor cells 42 is different from the infiltration state derived as the analysis result.

Figure 8D:
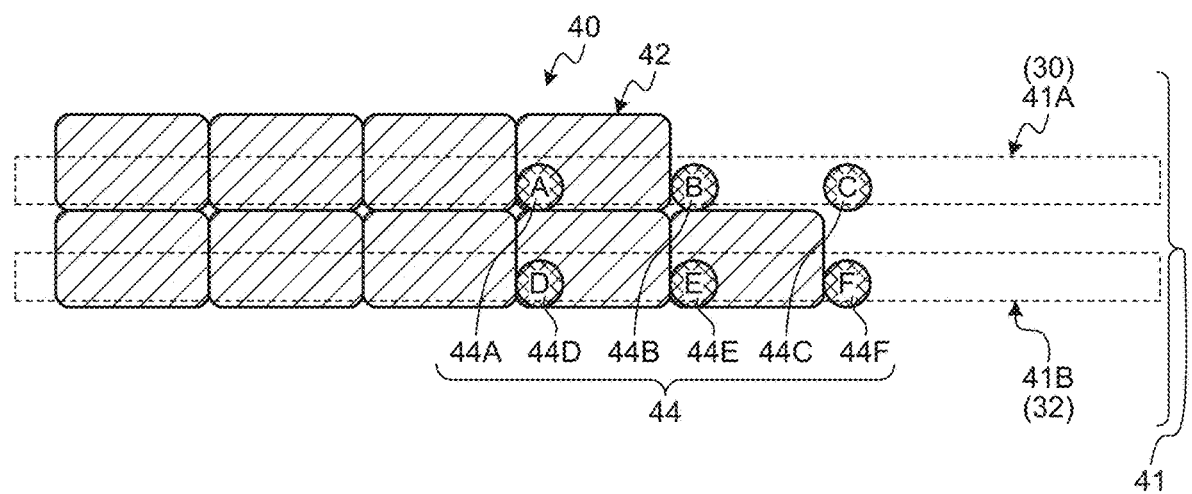
FIG. 8D is an explanatory diagram of an example of a stained state of a bright visual field image and a fluorescence image according to an embodiment of the present disclosure.

FIG. 8D is an explanatory diagram of the bright visual field image 30 of the first section 41A in which the tumor cells 42 are HE-stained and markers of the lymphocytes 44 are stained with a fluorescent dye, and the fluorescence image 32B of the second section 41B in which the tumor cells 42 are HE-stained and markers of the lymphocytes 44 are stained with a fluorescent dye.

In this case, a superimposed image 50 (not illustrated) of the bright visual field image 30 and the fluorescence image 32 is an image whose state matches the actual state of the specimen 40. Therefore, in this case, the actual infiltration state of the lymphocytes 44 into the tumor cells 42 matches the infiltration state derived as the analysis result.

FIG. 9 is a diagram illustrating the positional relationship between the tumor cell 42 and the lymphocyte 44 and the stained state described using FIGS. 8A, 8B, 8C and, 8D. In FIG. 9, "actual" indicates the positional relationship between the tumor cells 42 and the lymphocytes 44 in the actual specimen 40 illustrated in FIG. 8A. In FIG. 9, pattern 1 to pattern 3 correspond to FIGS. 8A, 8B, 8C and, 8D, respectively.

In FIG. 9, "A" to "F" correspond to lymphocytes 44A to 44F, respectively. In FIG. 9, "N.D." indicates that the superimposed image 50 does not include the expression information of the marker. In FIG. 9, "IN" means that the corresponding lymphocyte 44 is determined to be present in the tumor cell 42. In FIG. 9, "OUT" means that the corresponding lymphocyte 44 is determined to be present outside the tumor cell 42.

As illustrated in FIG. 9, when, the section 41 in which the tumor cell 42 is HE-stained and the marker of the lymphocyte 44 is stained with the fluorescent dye is used in both the bright visual field image 30 and the fluorescence image 32, it is possible to determine the positional relationship between the lymphocyte 44 and the tumor cell 42 in the same state as the actual state of the specimen 40.

Therefore, in a case where different sections 41 of the identical specimen 40 are used as the section 41 used for the bright visual field image 30 and the section 41 used for the fluorescence image 32, the analysis device 10 preferably uses sections 41 stained under the following staining conditions.

That is, the bright visual field image acquisition unit 20B preferably acquires the bright visual field image 30 of the first section 41A of the specimen 40 in which cells are HE stained and specific cells are stained (cells such as lymphocytes or markers thereof). In addition, the fluorescence image acquisition unit 20A preferably acquires the fluorescence image 32 of the second section 41B of the specimen 40 in which cells are HE stained and specific cells are stained.

Returning to FIG. 1A, the description will be continued. Next, the display control unit 20I will be described.

The display control unit 20I generates, on the display unit 24A, a display screen including at least one of the bright visual field image 30, the fluorescence image 32, the fluorescence correction image 34, the superimposed image obtained by superimposing the bright visual field image 30, and the fluorescence image 32 or the fluorescence correction image 34, and the analysis result.

FIGS. 10A, 10B, 10C, 10D, 10E and, 10F are schematic diagrams of an example of a display screen 60.

Figure 10A:
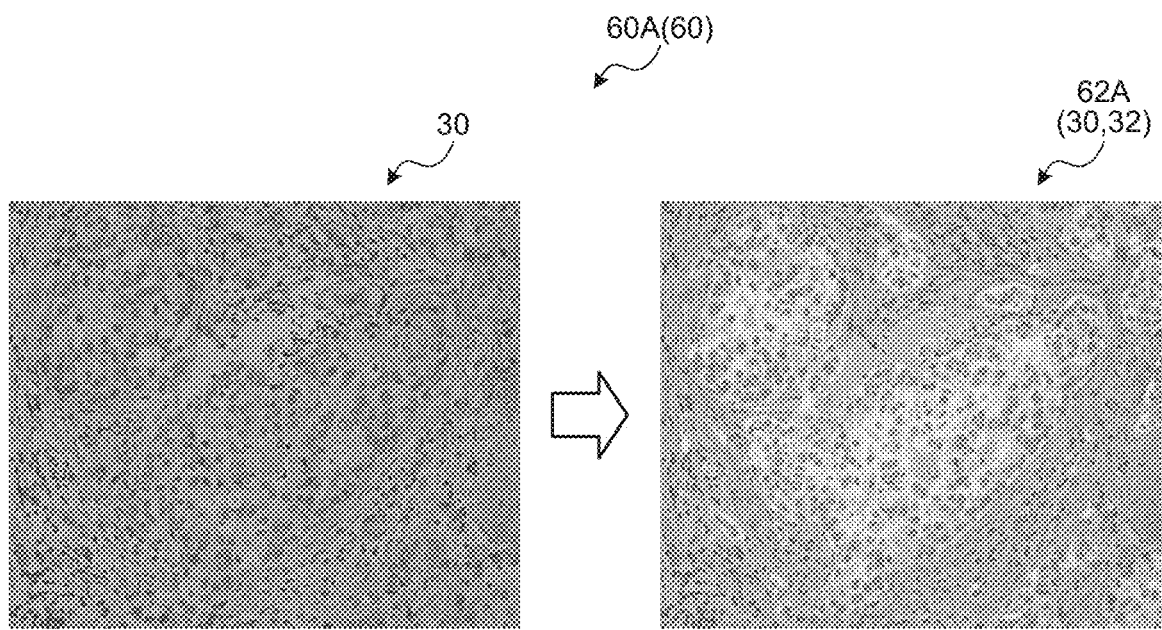
FIG. 10A is a schematic diagram of an example of a display screen according to an embodiment of the present disclosure.

FIG. 10A is a diagram illustrating an example of a display screen 60A. The display screen 60A is an example of the display screen 60. As illustrated in FIG. 10A, the display control unit 20I displays, on the display unit 24A, the display screen 60 including a superimposed image 62A in which the fluorescence image 32 of the specimen 40 corresponding to the bright visual field image 30 is superimposed on the bright visual field image 30. Note that the superimposed image 62A may be an image in which the bright visual field image 30 is superimposed on the fluorescence image 32.

Figure 10B:
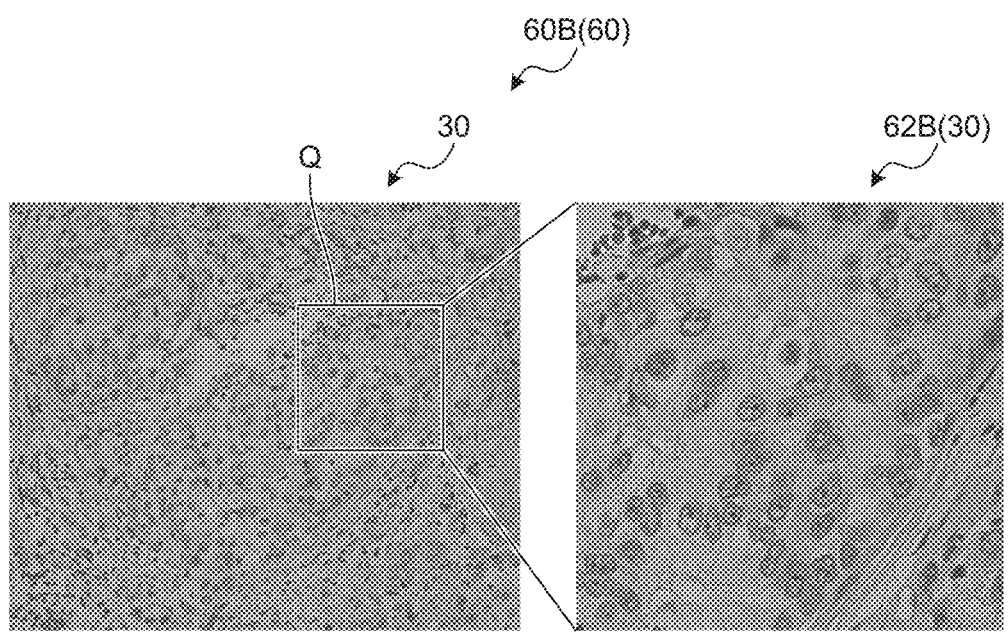
FIG. 10B is a schematic diagram of an example of a display screen according to an embodiment of the present disclosure.

FIG. 10B is a diagram illustrating an example of a display screen 60B. The display screen 60B is an example of the display screen 60. For example, the display control unit 20I displays the bright visual field image 30 and a region selection frame Q for receiving selection of a specific region on the bright visual field image 30. The user operates the input unit 24B to adjust the position and the size of the region selection frame Q on the bright visual field image 30. For example, when receiving an execution instruction signal or the like from the input unit 24B, the display control unit 20I generates an enlarged image 62B in which the inside of the region selection frame Q on the bright visual field image 30 is enlarged and displayed, and displays the enlarged image on the display unit 24A. Note that the display control unit 20I may display, on the display unit 24A, the display screen 60B including a superimposed image obtained by superimposing the enlarged image 62B on the bright visual field image 30.

Figure 10C:
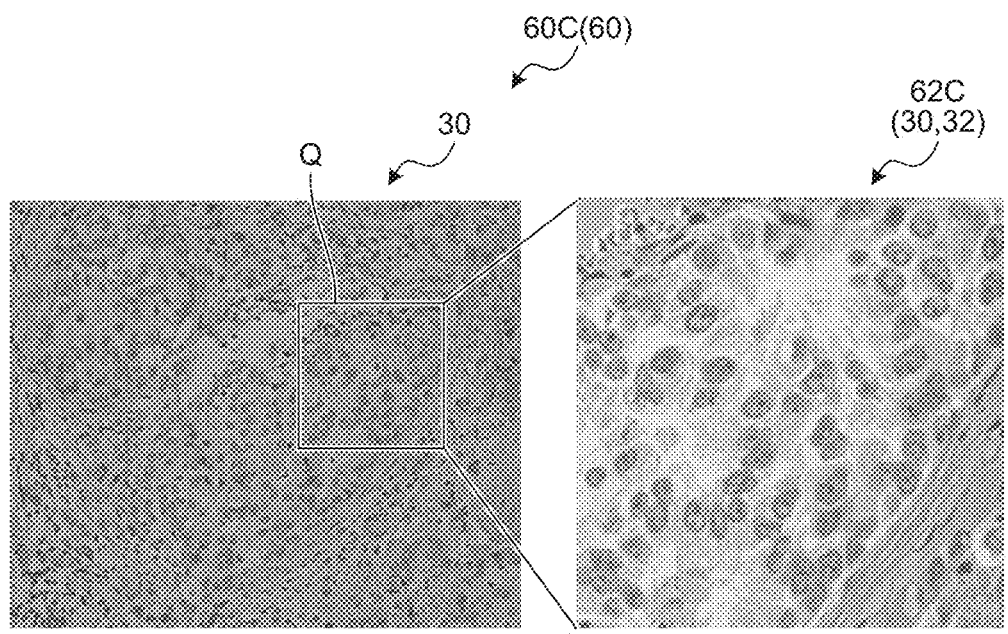
FIG. 10C is a schematic diagram of an example of a display screen according to an embodiment of the present disclosure.

FIG. 10C is a diagram illustrating an example of a display screen 60C. The display screen 60C is an example of the display screen 60. For example, as in FIG. 10B, the display control unit 20I displays the region selection frame Q on the bright visual field image 30. The user operates the input unit 24B to adjust the position and the size of the region selection frame Q on the bright visual field image 30. For example, when receiving an execution instruction signal or the like from the input unit 24B, the display control unit 20I generates a superimposed image 62C in which on the enlarged image obtained by enlarging the inside of the region selection frame Q on the bright visual field image 30, the inside of the region selection frame Q of the fluorescence image 32 enlarged at the same magnification is superimposed, and displays the superimposed image on the display unit 24A.

Figure 10D:
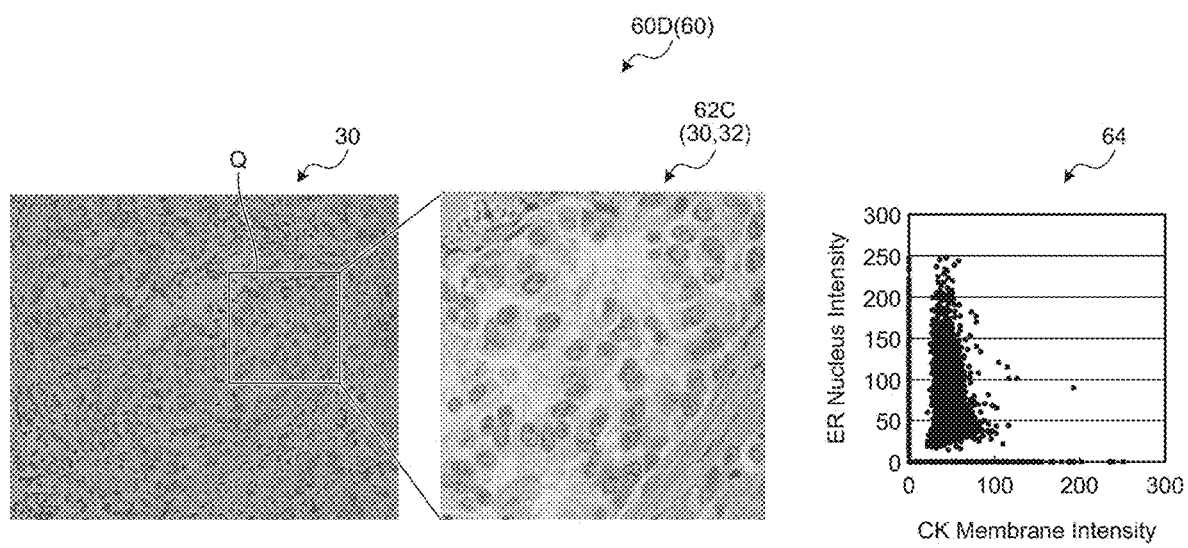
FIG. 10D is a schematic diagram of an example of a display screen according to an embodiment of the present disclosure.

FIG. 10D is a diagram illustrating an example of a display screen 60D. The display screen 60D is an example of the display screen 60. For example, as in FIG. 10C, the display control unit 20I displays the bright visual field image 30 and the superimposed image 62C on the display unit 24A. At this time, the display control unit 20I may further display the display screen 60D including an analysis result 64 on the display unit 24A. FIG. 10D illustrates information indicating the distribution of the analysis target as an example of the analysis result 64. In addition, the display control unit 20I may display fluorescence signal information in the correction target region P1 on the display unit 24A as an analysis result. In this case, the display unit 24A can display the correction target region P1 and the fluorescence signal information in the correction target region P1 on the bright visual field image 30.

Note that the display form of the analysis result 64 is not limited to the display form illustrated in FIG. 10D. For example, the display control unit 20I may display the analysis result 64 in the vicinity of the corresponding region as information (annotation information) indicating the annotation of the corresponding region (for example, the first region PA or the second region PB). That is, the display control unit 20I may cause the display unit 24A to display the annotation information based on the information about the correction target region P1.

Furthermore, the display control unit 20I may display the analysis result 64 in three-dimensional (3D) display or a bar graph according to the analysis result 64.

Figure 10E:
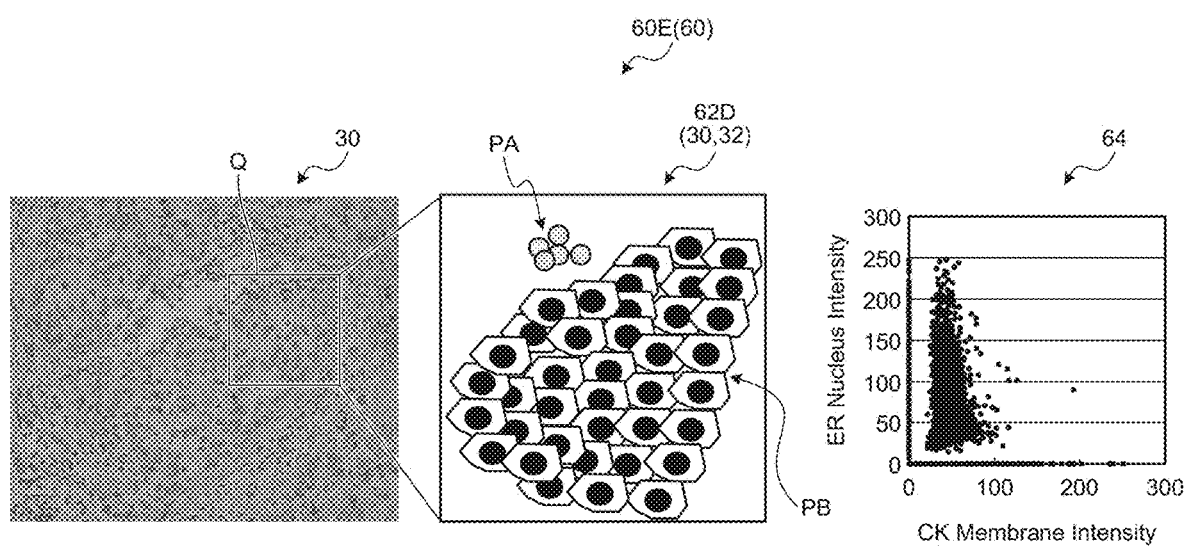
FIG. 10E is a schematic diagram of an example of a display screen according to an embodiment of the present disclosure.

FIG. 10E is a diagram illustrating an example of a display screen 60E. The display screen 60E is an example of the display screen 60. For example, as in FIG. 10B, the display control unit 20I displays the region selection frame Q on the bright visual field image 30. The user operates the input unit 24B to adjust the position and the size of the region selection frame Q on the bright visual field image 30. The display control unit 20I receives, for example, an execution instruction signal from the input unit 24B. Then, the display control unit 20I generates a superimposed image 62D in which on the enlarged image obtained by enlarging the inside of the region selection frame Q on the bright visual field image 30, the inside of the region selection frame Q of the fluorescence image 32 enlarged at the same magnification is superimposed, and displays the superimposed image on the display unit 24A.

At this time, the display control unit 20I may display an image in which at least one of the enlarged image in the region selection frame Q of the bright visual field image 30 and the enlarged image in the region selection frame Q of the fluorescence image 32 is schematically illustrated as illustrated in FIG. 10E. At this time, in the superimposed image 62D, the first region PA that is the correction target region P1 and the second region PB that is a region other than the correction target region P1 may be displayed in different display forms (see FIG. 10E). Furthermore, the display control unit 20I may further display the display screen 60D including the analysis result 64 on the display unit 24A. Although not illustrated, the display control unit 20I may further display depth information of the cell. Furthermore, the display control unit 20I may further display the display screen 60E including the analysis result 64 on the display unit 24A.

Figure 10F:
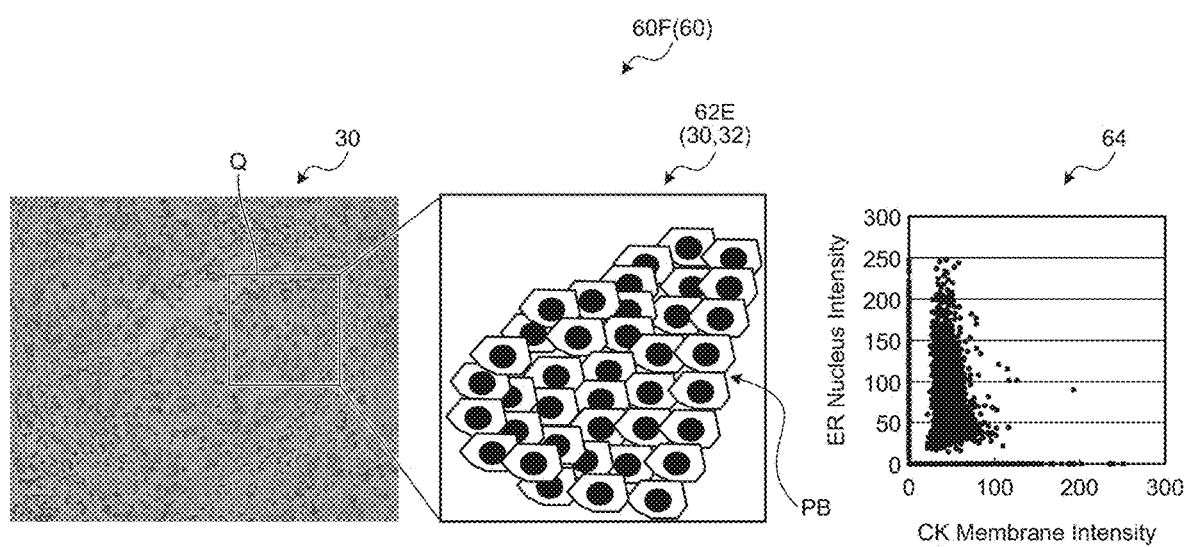
FIG. 10F is a schematic diagram of an example of a display screen according to an embodiment of the present disclosure.

FIG. 10F is a diagram illustrating an example of a display screen 60F. The display screen 60F is an example of the display screen 60. For example, as in FIG. 10B, the display control unit 20I displays the region selection frame Q on the bright visual field image 30. The user operates the input unit 24B to adjust the position and the size of the region selection frame Q on the bright visual field image 30. For example, when receiving an execution instruction signal or the like from the input unit 24B, the display control unit 20I generates the superimposed image 62D in which on the enlarged image obtained by enlarging the inside of the region selection frame Q on the bright visual field image 30, the inside of the region selection frame Q of the fluorescence image 32 enlarged at the same magnification is superimposed, and displays the superimposed image on the display unit 24A.

At this time, the display control unit 20I may display an image in which at least one of the enlarged image in the region selection frame Q of the bright visual field image 30 and the enlarged image in the region selection frame Q of the fluorescence image 32 is schematically illustrated as illustrated in FIG. 10F. The display control unit 20I may remove the first region PA that is the correction target region P1, and selectively display the second region PB that is a region other than the correction target region P1 (see FIG. 10F). Furthermore, the display control unit 20I may further display the display screen 60D including the analysis result 64 on the display unit 24A.

Note that the display control unit 20I may display, on the display unit 24A, the display screen 60 further including the morphological information of at least one of the first region PA and the second region PB that are the correction target region P1 included in the fluorescence correction image 34. Note that the analysis result 64 may include the morphological information.

The morphological information of the first region PA and the second region PB is information indicating the position, the size, and the range of each of the first region PA and the second region PB on the fluorescence correction image 34. Specifically, the morphological information of the first region PA and the second region PB is represented by a display form indicating the position, the size, and the range thereof. The display form is, for example, a frame line indicating the outer shapes of the first region PA and the second region PB, a specific color indicating the first region PA and the second region PB, blinking display or highlight display of the first region PA and the second region PB, display in which luminance of the first region PA and the second region PB is increased, or the like. The blinking display includes blinking in which the luminance of at least one of the first region PA and the second region PB is periodically changed. The highlighted display includes display by color or size for attracting attention.

Note that, when a specific position in the display screen 60 is instructed by an operation instruction of the input unit 24B by the user or the like, the display control unit 20I may further display an image related to the image displayed at the instructed position. For example, it is assumed that the analysis result 64 is displayed at the instructed position. In this case, the display control unit 20I may search the storage unit 22 for at least one of another analysis result 64 that matches or is similar to the analysis result 64, the bright visual field image 30 used for analysis of the analysis result 64, the fluorescence image 32, and the fluorescence correction image 34, and further display the searched result on the display unit 24A.

In addition, the display control unit 20I may display the analysis result 64 for each analyzed region.

Specifically, when the analysis is performed for each of the first region PA and the second region PB, the display control unit 20I may display the analysis result of the first region PA and the analysis result of second region PB on the display unit 24A.

Furthermore, it is assumed that the display control unit 20I has performed analysis for each region obtained by dividing the fluorescence correction image 34 according to at least one of the color value of the bright visual field image 30 and the fluorescence intensity value of the fluorescence correction image 34. In this case, the display control unit 20I may display the analysis result 64 on the display unit 24A for each region. By displaying the analysis result 64 for each region, it is possible to display an annotation of each region. At this time, the display control unit 20I may generate a line dividing the cell region for each cell included in the bright visual field image 30 and display the cell region so that it is superimposed on the fluorescence image 32.

In addition, the display control unit 20I may display, as the analysis result 64, a histogram in which measurement parameters of individual cells are plotted on the channel axis. Specifically, a dot plot like graph of cytometry may be displayed.

Note that the display control unit 20I may switch the display screen 60 when receiving the screen switching signal. For example, the user instructs screen switching by operating the input unit 24B. In response to the screen switching instruction by the operation of the input unit 24B, the display control unit 20I receives the screen switching signal from the input unit 24B.

When receiving the screen switching signal, the display control unit 20I changes one of the bright visual field image 30, the fluorescence image 32, the fluorescence correction image 34, the superimposed image, and the analysis result 64 displayed on the display screen 60 to any other one. In addition, the display control unit 20I may switch the displayed display screen 60 (the display screen 60A to the display screen 60F) to another display screen 60 (the display screen 60A to the display screen 60F).

Furthermore, the display control unit 20I may display at least one of the bright visual field image 30, the fluorescence image 32, and the fluorescence correction image 34 during reception of the operation (for example, mouse operation) of the input unit 24B by the user, and display the analysis result 64 when the operation is stopped. Furthermore, the display control unit 20I may display the analysis result 64 during reception of the operation (for example, mouse operation) of the input unit 24B by the user, and display at least one of the bright visual field image 30, the fluorescence image 32, and the fluorescence correction image 34 when the operation is stopped.

In addition, the display control unit 20I may switch the display screen 60 using the combined image 38.

Figure 11:
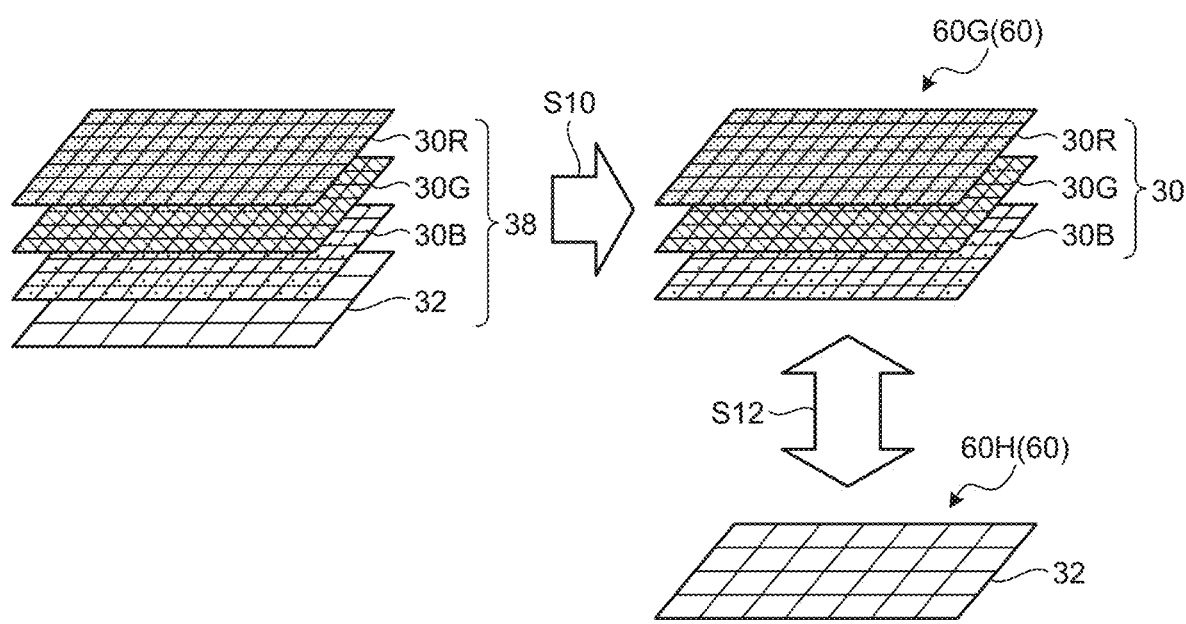
FIG. 11 is a schematic diagram illustrating an example of switching of a display screen according to an embodiment of the present disclosure.

FIG. 11 is a schematic diagram illustrating an example of switching of the display screen 60 using the combined image 38. As described above, the combined image 38 is an image obtained by combining the bright visual field image 30 and the fluorescence image 32 for each corresponding pixel.

The display control unit 20I receives, for example, a display instruction signal from the input unit 24B. Then, the display control unit 20I displays a display screen 60G including the bright visual field image 30 (bright visual field image 30R, bright visual field image 30G, and bright visual field image 30B) included in the combined image 38 on the display unit 24A (Step S10). Then, the display control unit 20I may switch the display of the display screen 60G including the bright visual field image 30 and the display of a display screen 60H including the fluorescence image 32 every time the screen switching signal is received (Step S12).

At this time, the display control unit 20I can easily display the display screen 60H including the fluorescence image 32 on the display unit 24A by extracting the fluorescence image 32 from the combined image 38 including the bright visual field image 30 being displayed. Similarly, the display control unit 20I can easily display the display screen 60H including the bright visual field image 30 on the display unit 24A by extracting the bright visual field image 30 from the combined image 38 including the fluorescence image 32 being displayed. That is, the display control unit 20I can easily switch the display screen 60 by using the combined image 38.

Next, an example of a procedure of the information process executed by the analysis device 10 will be described.

Figure 12:
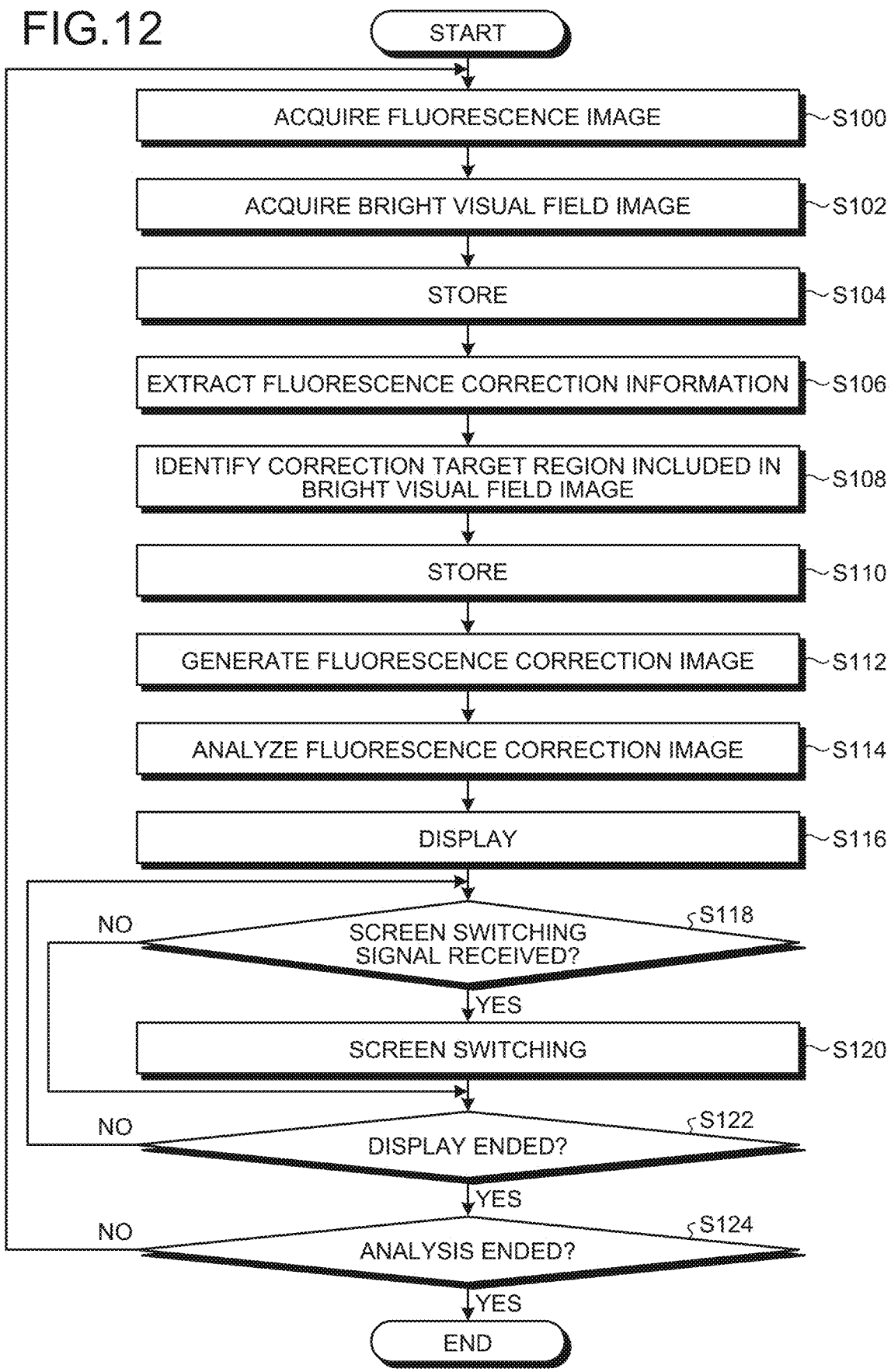
FIG. 12 is a flowchart illustrating an example of a procedure of the information process according to an embodiment of the present disclosure.

FIG. 12 is a flowchart illustrating an example of a procedure of the information process executed by the analysis device 10.

First, the fluorescence image acquisition unit 20A acquires the fluorescence image 32 (Step S100). Next, the bright visual field image acquisition unit 20B acquires the bright visual field image 30 of the specimen 40 corresponding to the fluorescence image 32 acquired in Step S100 (Step S102).

The storage control unit 20C stores the fluorescence image 32 acquired in Step S100 and the bright visual field image 30 acquired in Step S102 in the storage unit 22 in association with each other for the identical specimen 40 (Step S104).

Therefore, every time the fluorescence image acquisition unit 20A and the bright visual field image acquisition unit 20B acquire the fluorescence image 32 and the bright visual field image 30, the fluorescence image 32 and the bright visual field image 30 corresponding to the specimen 40 are sequentially stored in the storage unit 22.

Note that, at this time, the storage control unit 20C may generate the combined image 38 using the bright visual field image 30 and the fluorescence image 32 for each specimen 40 and store the combined image in the storage unit 22.

The extraction unit 20E extracts fluorescence correction information from the bright visual field image 30 acquired in Step S102 (Step S106).

The identification unit 20F identifies the correction target region P1 included in the bright visual field image 30 acquired in Step S102 based on the fluorescence correction information extracted in Step S106 (Step S108). The identification unit 20F stores the correction target region P1 identified in Step S108 in the storage unit 22 in association with the bright visual field image 30 used to identify the correction target region P1 (Step S110).

Therefore, the storage unit 22 stores the bright visual field image 30, the fluorescence image 32 (fluorescence image 32A to fluorescence image 32D), and the morphological information of the correction target region P1 in association with each other for each specimen 40.

At this time, the learning unit 20D may learn the learning model 23. Note that the learning timing of the learning model 23 by the learning unit 20D is not limited to this timing.

Next, the generation unit 20G generates the fluorescence correction image 34 based on the fluorescence image 32 acquired in Step S100 and the fluorescence correction information extracted in Step S106 (Step S112). The generation unit 20G generates a fluorescence correction image 34 by using the fluorescence image 32 acquired in Step S100 and the correction target region P1 identified based on the fluorescence correction information in Step S108.

The analysis unit 20H analyzes the fluorescence correction image 34 generated in Step S112, and derives the analysis result 64 (Step S114).

The display control unit 20I generates, on the display unit 24A, the display screen 60 including at least one of the analysis result 64 derived in Step S114, the fluorescence image 32 acquired in Step S100, and the bright visual field image 30 acquired in Step S102 (Step S116).

The display control unit 20I determines whether a screen switching signal has been received (Step S118). When it is determined that the screen switching signal has been received (Step S118: Yes), the process proceeds to Step S120.

In Step S120, the display control unit 20I switches the display screen 60 displayed on the input unit 24B to another display screen 60 (Step S120). Then, the process proceeds to Step S122. When the negative determination is made in Step S118 (Step S118: No), the process similarly proceeds to Step S122.

In Step S122, the display control unit 20I determines whether to end the display of the display screen 60 on the display unit 24A (Step S122). For example, the display control unit 20I determines whether a signal indicating a display end instruction has been received from the input unit 24B, thereby making the determination in Step S122. When a negative determination is made in Step S122 (Step S122: No), the process returns to Step S118. When an affirmative determination is made in Step S122 (Step S122: Yes), the process proceeds to Step S124.

The display control unit 20I determines whether to end the analysis (Step S124). For example, the display control unit 20I determines whether a signal indicating an analysis end instruction has been received from the input unit 24B, thereby making the determination in Step S124. When a negative determination is made in Step S124 (Step S124: No), the process returns to Step S100. When an affirmative determination is made in Step S124 (Step S124: Yes), this routine is ended.

Note that there is a case where the display control unit 20I receives the display instruction signal during the process of any of Steps S100 to S114. In this case, when receiving the display instruction signal, the display control unit 20I may interrupt the process and execute the process of Steps S116 to S122.

As described above, the information processing device 1 of the present embodiment includes the extraction unit 20E and the generation unit 20G. The extraction unit 20E extracts fluorescence correction information from the bright visual field image 30 of the specimen 40. The generation unit 20G generates the fluorescence correction image 34 based on the fluorescence information and the fluorescence correction information of the specimen 40.

Here, in the prior art, it is sometimes difficult to analyze a specimen with high accuracy. Specifically, for example, in the prior art, the fluorescence image 32 is used for analysis, and autofluorescence components or the like included in the fluorescence image 32 may affect the analysis result. That is, in the related art, there is a case where the fluorescent dye component and the autofluorescence component cannot be completely discriminated. Specifically, such a problem has occurred in a case where the spectrum of the fluorescent dye and the autofluorescence spectrum are close in wavelength, these spectrum shapes are similar, the intensity of the autofluorescence spectrum is stronger than the spectrum of the fluorescent dye, or the like.

Specifically, it is difficult to distinguish between the spectrum of the fluorescent dye and the spectrum of the autofluorescence component in the normal filter-type photographing rather than the multichannel photographing such as the spectral spectrum. Furthermore, even in a case where wavelength resolution is improved as in optical spectrum photographing, an autofluorescence signal may remain depending on a photographing location.

For example, in a case where a region having a partially weak fluorescence intensity is present at an edge portion of the red blood cell region, a central portion of the red blood cell region, or the like, the shape of the autofluorescence spectrum may change due to an influence of noise or the like at the time of photographing. In addition, it is known that the preservation state of the specimen 40, the tissue immobilization method, and the like affect the shape and intensity of the autofluorescence spectrum. Therefore, the shape of the autofluorescence spectrum may change. In such a case, even when standard autofluorescence spectrum data is acquired in advance and autofluorescence correction is performed, sufficient autofluorescence correction may not be performed, because the shape of the photographed autofluorescence spectrum is changed.

As described above, in the prior art, it is sometimes difficult to analyze a specimen with high accuracy.

On the other hand, in the information processing device 1 of the present embodiment, the extraction unit 20E extracts the fluorescence correction information from the bright visual field image 30 of the specimen. The generation unit 20G generates the fluorescence correction image 34 based on the fluorescence information of the specimen and the fluorescence correction information.

That is, the information processing device 1 of the present embodiment generates the fluorescence correction image 34 from the fluorescence information of the specimen (for example, the fluorescence image 32) using the fluorescence correction information extracted from the bright visual field image 30. Therefore, the specimen 40 can be analyzed with high accuracy by using the fluorescence correction image 34 for analysis.

Therefore, the information processing device 1 of the present embodiment can analyze the specimen 40 with high accuracy.

Furthermore, the fluorescence image 32 may include local fluorescent dye noise derived from debris, dirt, aggregates of fluorescent dyes, fragments due to peeling of tissue sections, and the like. However, the information processing device 1 of the present embodiment corrects the correction target region P1 of the fluorescence image 32 using the correction target region P1 of the bright visual field image 30 identified based on the fluorescence correction information. Since the information processing device 1 of the present embodiment performs the analysis using the fluorescence correction image 34 obtained by easily correcting the correction target region P1 including noise and the like included in the fluorescence image 32, the specimen 40 can be analyzed with high accuracy.

Here, a cell or a region that is not fluorescently stained in the specimen 40 is treated as a region where nothing exists in the fluorescence image 32. Therefore, in the conventional analysis technique using the fluorescence image 32, the analysis accuracy may be deteriorated. For example, in the case of analyzing the ratio of marker-expressing negative cells contained in the specimen 40, when the presence or absence of the cells cannot be identified from the fluorescence image 32, it has been impossible to analyze the ratio. Therefore, there is also a method of using the fluorescence image 32 of the nucleus stained specimen 40. However, with only the nucleus stained specimen 40, segmentation of cells was insufficient, and it was difficult to analyze the accurate ratio.

In addition, in a case where the fluorescence image 32 includes a region having a weak fluorescence signal or a region having no fluorescence signal, when the fluorescence image 32 is analyzed, it is difficult to identify whether there is no tissue or the fluorescence signal is weak. For this reason, in the related art, it was difficult to obtain morphological information and an overall image of an analysis target, and it was difficult to analyze the specimen 40 with high accuracy.

On the other hand, the information processing device 1 of the present embodiment identifies the correction target region P1 using the bright visual field image 30, and generates the fluorescence correction image 34 obtained by correcting the correction target region P1 included in the fluorescence image 32. Then, the analysis unit 20H analyzes the fluorescence correction image 34. Therefore, at the time of display by the display control unit 20I, the nucleus, the intracellular organelle, the cell membrane, the tissue stroma, the fat site, the necrotic area, and the like can be further displayed as the analysis result 64 based on the bright visual field image 30, and necessary information can be added to the fluorescence correction image 34 and provided.

Furthermore, in the present embodiment, the identification unit 20F identifies the correction target region P1 that is the autofluorescence region or the light absorption region included in the bright visual field image 30. Therefore, the generation unit 20G can correct the autofluorescence region or the light absorption region included in the fluorescence image 32 with high accuracy. Therefore, the information processing device 1 of the present embodiment can analyze the specimen 40 with high accuracy.

Here, it is difficult to distinguish between a signal derived from a fluorescent dye and a signal derived from autofluorescence only by the fluorescence image 32. On the other hand, it is possible to identify an autofluorescence region such as a red blood cell by the bright visual field image 30. Therefore, the identification unit 20F identifies the correction target region P1 that is the autofluorescence region or the light absorption region included in the bright visual field image 30 and uses the correction target region P1 for correction of the fluorescence image 32, so that the specimen 40 can be analyzed with high accuracy.

Furthermore, the identification unit 20F identifies the position, the size, and the range of the correction target region P1 included in the bright visual field image 30. Therefore, the generation unit 20G can accurately identify and correct the first region PA corresponding to the correction target region P1 included in the fluorescence image 32. Therefore, the information processing device 1 of the present embodiment can analyze the specimen 40 with high accuracy by using the fluorescence correction image 34 for analysis.

Furthermore, the identification unit 20F identifies the correction target region P1 using the learning model 23 with the bright visual field image 30 as an input and the correction target region P1 as an output and the acquired bright visual field image 30. By identifying the correction target region P1 using the learning model 23, the correction target region P1 can be identified with high accuracy and high speed.

In addition, the generation unit 20G generates the fluorescence correction image 34 obtained by removing the region (first region PA) corresponding to the correction target region P1. Therefore, the information processing device 1 of the present embodiment can analyze the specimen 40 with high accuracy by analyzing the fluorescence correction image 34.

In addition, the generation unit 20G generates the fluorescence correction image 34 based on the peripheral information of the correction target region P1. Therefore, the generation unit 20G can generate the fluorescence correction image 34 obtained by easily and accurately correcting the fluorescence image 32.

In addition, the fluorescence image acquisition unit 20A acquires the fluorescence image 32 photographed under the photographing condition that the brightness of the correction target region P1 is saturated.

Here, in the conventional color separation method based on a fluorescence spectrum shape, for example, when an autofluorescence component derived from a red blood cell is corrected, it is necessary to perform photographing under the photographing condition that a portion of the red blood cell component is not saturated at the time of observation. However, since the autofluorescence component of the red blood cell component indicates a high value, it is necessary to perform photographing under the photographing condition that a fluorescence signal is suppressed, such as shortening of exposure time and use of an ND filter. However, in this conventional method, it may be difficult to photograph a fluorescence signal having a weak fluorescence intensity included in the specimen 40.

On the other hand, in the present embodiment, the fluorescence image 32 is corrected by identifying the correction target region P1 from the bright visual field image 30, and analysis is performed using the fluorescence correction image 34 after correction. That is, in the present embodiment, the correction target region P1, which is an autofluorescence region derived from red blood cells or the like is identified using the bright visual field image 30. Therefore, in the information processing device 1 of the present embodiment, it is not necessary to adjust the photographing condition of the fluorescence image 32 to the photographing condition that is the brightness of the correction target region P1 is not saturated. In addition, the information processing device 1 of the present embodiment can acquire the fluorescence image 32 photographed under the photographing condition that the brightness of the correction target region P1 is saturated so that the fluorescence signal having the weak fluorescence intensity included in the specimen 40 can be photographed.

In addition, the bright visual field image acquisition unit 20B acquires the bright visual field image 30 of the section 41 of the HE-stained specimen 40.

Herein, in the related art, an intercalator dye such as DAPI has been used as a fluorescent dye for nucleus staining. However, DAPI has a broad fluorescence spectrum and causes leakage to other fluorescent dye wavelengths. In addition, since the presence or absence of nucleus staining has been conventionally identified by the wavelength shift at the time of intercalation, the degree of intercalation is affected by the wavelength shift, so that the shape of the standard spectrum tends to vary. For this reason, in the related art, there is a problem that the color separation accuracy decreases.

On the other hand, in the present embodiment, the bright visual field image 30 of the section 41 of the HE-stained specimen 40 is used as the bright visual field image 30. Therefore, in the information processing device 1 of the present embodiment, it is possible to identify the location of the nucleus based on the bright visual field image 30 which is the HE stained image. Therefore, in the information processing device 1 of the present embodiment, the display control unit 20I can display the nucleus stained image according to the bright visual field image 30 on the fluorescence image 32 using the bright visual field image 30 without using the intercalating dye. Furthermore, by using the bright visual field image 30, the analysis unit 20H can easily identify the location of the nucleus even in a case where an intercalating dye is used for the fluorescence image 32.

Note that the display control unit 20I uses an image display control program for displaying the above-described fluorescence image or bright visual field image. However, the present invention is not limited thereto, and the image display control program may be downloaded from a server or installed from a storage medium such as a digital versatile disc (DVD) to a general-purpose computer to implement the process by the display control unit 20I described below. In addition, the process performed by the display control unit 20I may be realized by performing the process by two or more devices such as performing some processes on a server and performing other processes on a computer such as a display control unit H. In addition, the image display control program may operate on the cloud to implement the process by the display control unit 20I described below.

In addition, the bright visual field image acquisition unit 20B acquires the bright visual field image 30 of the first section 41A of the specimen 40 that is stained with HE and in which specific cells are stained, and the fluorescence image acquisition unit 20A acquires the fluorescence image 32 of the second section 41B of the specimen 40 that is stained with HE and in which specific cells are stained.

Therefore, it is possible to suppress acquisition of an analysis result different from the positional relationship between the tumor cell 42 and the lymphocyte 44 in the actual specimen 40.

Specifically, in the related art, the bright visual field image 30 of the HE-stained specimen 40 is used as the bright visual field image 30 used for pathological diagnosis. Therefore, it is difficult to identify the target from the bright visual field image 30. Therefore, in the related art, it is difficult to accurately grasp the region of the target that expresses the tumor cell 42 and to identify the type of immune cell such as a helper T cell or a cytotoxic T cell.

On the other hand, fluorescent staining is used to identify the target. However, the conventional fluorescence image is a dark visual field image, and an unstained object is a dark visual field. Therefore, morphological information of tissues and cells is lost. Therefore, it is difficult to identify the tumor region in the conventional fluorescence image. In addition, a method in which an anti-cytokeratin antibody is used for assisting identifying a tumor region is disclosed, but since the anti-cytokeratin antibody is an epithelial marker, the tumor region and the number of tumor cells cannot be accurately identified.

In melanoma, the biomarker SOX10 for identifying a tumor region is used as a target, and studies for identifying a tumor region by immunostaining have been conducted. As a lung cancer marker, the thyroid transcription factor-1 (TTF-1) is used for immunostaining. However, while TTF-1 has a high positive rate of about 80% in lung adenocarcinoma and may be used for identifying a tumor region, it has a low expression level in lung squamous cell carcinoma and usually indicates negative. Therefore, it was not be able to be applied to the identification of the tumor region. In addition, there are few targets capable of identifying the tumor region, and the tumor region cannot be identified only by fluorescent staining.

On the other hand, in the present embodiment, the bright visual field image 30 of the first section 41A of the specimen 40 that is stained with HE and in which specific cells are stained and the fluorescence image 32 of the second section 41B of the specimen 40 that is stained with HE and in which specific cells are stained are used. Therefore, the superimposed image 50 of the bright visual field image 30 and the fluorescence image 32 is an image whose state matches the actual state of the specimen 40. Therefore, the information processing device 1 of the present embodiment can determine the positional relationship between the lymphocytes 44 and the tumor cells 42 in the state same as the actual state of the specimen 40.

Furthermore, for example, the information processing device 1 of the present embodiment can identify immune cells (such as the lymphocytes 44) that have infiltrated into the tumor cells 42, and measure the number and distance of the immune cells, and the information processing device 1 of the present embodiment can accurately analyze the distribution of biomarkers (an immune checkpoint molecule, a molecule serving as an index of a molecular target drug, and the like), which are an example of targets that express the tumor cells 42, and the like. Furthermore, the information processing device 1 of the present embodiment can accurately identify the tumor region by using the superimposed image 50 of the bright visual field image 30 and the fluorescence image 32 when identifying the tumor region (for example, the correction target region P1).

In addition, in the information processing device 1 of the present embodiment, since the tumor cells can be identified by the bright visual field image 30, not only the tumor region but also the number of tumor cells can be calculated. Furthermore, in the information processing device 1 of the present embodiment, the expression of the biomarker can be detected by the fluorescence image 32. Furthermore, the information processing device 1 of the present embodiment can calculate the number of biomarker positive or negative cells per the number of tumor cells by superimposing the bright visual field image 30 and the fluorescence image 32. Incidentally, machine learning may be used to identify the number of tumor cells and the region per tumor cell. For example, the information processing device 1 according to the present embodiment can calculate HER2-positive cells per the total number of tumor cells in a tissue section. Specifically, for example, by analyzing the fluorescence correction image 34, the information processing device 1 can obtain an analysis result in which 50 cells out of 100 tumor cells present in the tissue specimen are HER2-positive cells, and the ratio of the HER2-positive tumor cells is 50%.

In addition, the analysis unit 20H analyzes the included analysis target based on the distribution of the fluorescence intensity value of at least one of the first region PA that is the correction target region P1 included in the fluorescence correction image 34 and the second region PB other than the first region PA. Therefore, the information processing device 1 of the present embodiment can accurately analyze both the first region PA and the second region PB.

In addition, the display control unit 20I displays, on the display unit 24A, the display screen 60 further including morphological information of at least one of the first region PA that is the correction target region P1 included in the fluorescence correction image 34 and the second region PB other than the first region PA. The display control unit 20I further displays the morphological information of at least one of the first region PA and the second region PB, whereby a more detailed analysis result 64 can be provided to the user.

In addition, the morphological information of the first region PA and the second region PB is represented by a display form indicating the position, the size, and the range thereof. The display form is, for example, a frame line indicating the outer shapes of the first region PA and the second region PB, a specific color indicating the first region PA and the second region PB, blinking display (blinking) or highlight display of the first region PA and the second region PB, display in which luminance of the first region PA and the second region PB is increased, or the like.

In the information processing device 1 of the present embodiment, the fluorescence image 32 is corrected using the bright visual field image 30. The display control unit 20I displays, on the display unit 24A, the display screen 60 further including morphological information of at least one of the first region PA that is the correction target region P1 included in the fluorescence correction image 34 and the second region PB other than the first region PA. Therefore, in the information processing device 1 of the present embodiment, it is possible to easily further display information about cells not fluorescently stained as morphological information of at least one of the first region PA and the second region PB. In addition, the information processing device 1 according to the present embodiment can easily provide information that can be utilized for cell segmentation by HE staining and fluorescence staining and analysis of the identical cell.

In addition, when receiving the screen switching signal, the display control unit 20I changes one of the bright visual field image 30, the fluorescence image 32, the fluorescence correction image 34, and the analysis result 64 displayed on the display screen 60 to any other one. Therefore, the display control unit 20I of the present embodiment can change the image according to the intention of the user.

In addition, the storage control unit 20C stores the combined image 38 in which the color value of the bright visual field image 30 and the fluorescence intensity value of the fluorescence image 32 are defined for each pixel in the storage unit 22 for each specimen 40. By using the combined image 38 for display, display switching between the bright visual field image 30 and the fluorescence image 32 can be easily performed. Note that the combined image 38 may be a combined image 38 in which the color value of the bright visual field image 30, the fluorescence intensity value of the fluorescence image 32, and the fluorescence intensity value of the fluorescence correction image 34 are defined for each pixel.

Furthermore, the fluorescence image acquisition unit 20A may acquire the fluorescence image 32 in which the fluorescence intensity value corresponding to each pixel of the bright visual field image 30 acquired by the bright visual field image acquisition unit 20B in the combined image 38 is defined for each pixel. Furthermore, the bright visual field image acquisition unit 20B may acquire the bright visual field image 30 in which the color value corresponding to each pixel of the fluorescence image 32 acquired by the fluorescence image acquisition unit 20A in the combined image 38 is defined for each pixel.

Note that the application target of the information processing device 1 of the present embodiment is not limited. For example, the information processing device 1 can be applied to a fluorescence in situ hybridization method (FISH method) or the like.

Note that, although the embodiment of the present disclosure is described above, the process according to the above-described embodiment may be performed in various different embodiments other than the above-described. Further, the above-described embodiments can be appropriately combined in a range where the processing contents do not contradict each other.

Further, the effects described in the present specification are merely examples and are not limited, and other effects may be present.

(Hardware Configuration)

Figure 13:
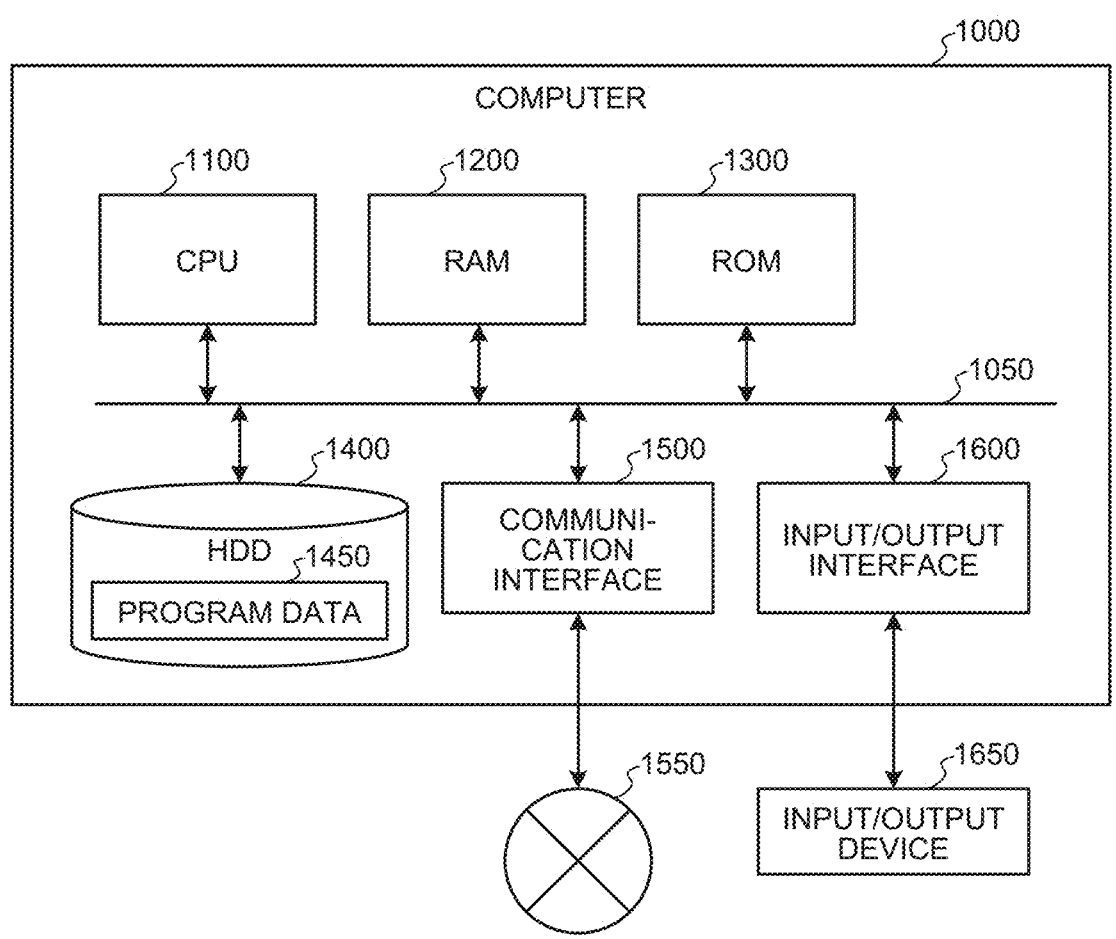
FIG. 13 is a hardware configuration diagram illustrating an example of a computer that implements functions of an analysis device of the present disclosure according to an embodiment of the present disclosure.

FIG. 13 is a hardware configuration diagram illustrating an example of a computer 1000 that implements the functions of the information processing device 1 according to the above embodiment.

The computer 1000 includes a CPU 1100, a RAM 1200, a read only memory (ROM) 1300, a hard disk drive (HDD)

1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processes corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records programs executed by the CPU 1100, data used by the programs, and the like. Specifically, the HDD 1400 is a recording medium that records a program or the like according to the present disclosure which is an example of program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 1 according to the above-described embodiment, the CPU 1100 of the computer 1000 executes the information processing program loaded on the RAM 1200 to implement the functions of the fluorescence image acquisition unit 20A and the like. In addition, the HDD 1400 stores a program according to the present disclosure and data in the storage unit 22. The CPU 1100 reads the program data 1450 from the HDD 1400 and executes the program data, but as another example, the program may be acquired from another device via the external network 1550.

Note that the present technology may also be configured as below.

(1)

An information processing device comprising:
an extraction unit that extracts fluorescence correction information from a bright visual field image of a specimen; and
a generation unit that generates a fluorescence correction image based on fluorescence information of the specimen and the fluorescence correction information.

(2)

The information processing device according to (1), further comprising:
a fluorescence image acquisition unit that acquires a fluorescence image including the fluorescence information of the specimen; and
a bright visual field image acquisition unit that acquires the bright visual field image.

(3)

The information processing device according to (1), wherein the fluorescence correction information is selected from color information, morphological information, or staining information of the bright visual field image.

(4)

The information processing device according to (1), further comprising:
an identification unit that identifies a correction target region of the bright visual field image based on the fluorescence correction information, wherein
the generation unit
generates the fluorescence correction image obtained by removing a region corresponding to the correction target region.

(5)

The information processing device according to (1), further comprising:
an identification unit that identifies a correction target region of the bright visual field image based on the fluorescence correction information, wherein
the generation unit
generates the fluorescence correction image based on peripheral information of the correction target region.

(6)

The information processing device according to (4), wherein
the generation unit
generates the fluorescence correction image obtained by removing a region corresponding to the correction target region corrected based on a weight value according to a standard spectrum derived from a specimen.

(7)

The information processing device according to (4), wherein
the correction target region
is an autofluorescence region or a light absorption region included in the bright visual field image.

(8)

The information processing device according to (1), further comprising:
a learning unit that learns a correspondence between the fluorescence information and the fluorescence correction information, wherein
the generation unit
generates the fluorescence correction image based on a learning result by the learning unit.

(9)

The information processing device according to (2), further comprising:
a display unit that displays at least one or more of the bright visual field image, a fluorescence image including the fluorescence information of the specimen, the fluorescence correction image, and a superimposed image obtained by superimposing the bright visual field image, and the fluorescence image or the fluorescence correction image.

(10)

The information processing device according to (9), wherein
the display unit
is caused to display annotation information based on information about a correction target region of the bright visual field image.

(11)

The information processing device according to (9), wherein
the display unit
is caused to display, in a bright visual field image, a correction target region of the bright visual field image and fluorescence signal information in the correction target region.

(12)

The information processing device according to (1), wherein the specimen includes an identical tissue section or continuous tissue sections.

(13)

The information processing device according to (9), wherein
the display unit
changes one of the bright visual field image, the fluorescence image, the fluorescence correction image, and the superimposed image that are being displayed when a screen switching signal is received to any other one.

(14)

The information processing device according to (1), wherein
the information processing device further comprises a storage control unit that stores, for each of the specimens, a combined image defining, for each of pixels, a fluorescence intensity value of a fluorescence image including a color value of the bright visual field image and the fluorescence information of the specimens.

(15)

The information processing device according to (1), further comprising:
a learning unit that learns a correspondence between the fluorescence information of the specimen and the bright visual field image, wherein
the generation unit
generates a bright visual field correction image based on a learning result by the learning unit.

(16)

A program causing a computer to execute the Steps of:
extracting fluorescence correction information from a bright visual field image of a specimen; and
generating a fluorescence correction image based on fluorescence information of the specimen and the fluorescence correction information.

REFERENCE SIGNS LIST

1 INFORMATION PROCESSING DEVICE
10 ANALYSIS DEVICE
20A FLUORESCENCE IMAGE ACQUISITION UNIT
20B BRIGHT VISUAL FIELD IMAGE ACQUISITION UNIT
20C STORAGE CONTROL UNIT
20D LEARNING UNIT
20E EXTRACTION UNIT
20F IDENTIFICATION UNIT
20G GENERATION UNIT
20H ANALYSIS UNIT
20I DISPLAY CONTROL UNIT
30 BRIGHT VISUAL FIELD IMAGE
32 FLUORESCENCE IMAGE
34 FLUORESCENCE CORRECTION IMAGE
40 SPECIMEN
41 SECTION
41A FIRST SECTION
41B SECOND SECTION

The invention claimed is:

1. An information processing device, comprising:
a central processing unit (CPU) configured to:
extract fluorescence correction information from a bright visual field image of a specimen;
identify a correction target region of the bright visual field image based on the fluorescence correction information;
correct, based on fluorescence information of the specimen and the fluorescence correction information, a fluorescence intensity value of each pixel of a plurality of pixels in a region corresponding to the correction target region in a fluorescence image; and
generate a fluorescence correction image based on the correction of the fluorescence intensity value of the each pixel of the plurality of pixels in the region.

2. The information processing device according to claim 1, wherein the CPU is further configured to:
acquire the fluorescence image that includes the fluorescence information of the specimen; and
acquire the bright visual field image.

3. The information processing device according to claim 2, further comprising:
a display screen configured to display at least one of the bright visual field image, the fluorescence image that includes the fluorescence information of the specimen, the fluorescence correction image, or a superimposed image, wherein the superimposed image corresponds to an image based on superimposition of the bright visual field image and one of the fluorescence image or the fluorescence correction image.

4. The information processing device according to claim 3, wherein the display screen is further configured to display annotation information based on information associated with the correction target region of the bright visual field image.

5. The information processing device according to claim 3, wherein the display screen is further configured to display, in the bright visual field image, the correction target region of the bright visual field image and fluorescence signal information in the correction target region.

6. The information processing device according to claim 3, wherein the display screen is further configured switch the display of the one of the bright visual field image, the fluorescence image, the fluorescence correction image, or the superimposed image based on a screen switching signal.

7. The information processing device according to claim 1, wherein the fluorescence correction information is one of color information, morphological information, or staining information of the bright visual field image.

8. The information processing device according to claim 1,
wherein the CPU is further configured to generate the fluorescence correction image based on removal of a region corresponding to the correction target region.

9. The information processing device according to claim 8, wherein
the CPU is further configured to remove the region corresponding to the correction target region based on a weight value, and
the weight value is based on a standard spectrum from the specimen.

10. The information processing device according to claim 8, wherein the correction target region is one of an auto-fluorescence region of the bright visual field image or a light absorption region of the bright visual field image.

11. The information processing device according to claim 1,
wherein the CPU is further configured to generate the fluorescence correction image based on peripheral information of the correction target region.

12. The information processing device according to claim 1, wherein the CPU is further configured to:
learn a correspondence between the fluorescence information and the fluorescence correction information to generate a learning result; and
generate the fluorescence correction image based on the learning result.

13. The information processing device according to claim 1, wherein the specimen includes one of an identical tissue section or continuous tissue sections.

14. The information processing device according to claim 1, wherein
the information processing device further comprises a storage control unit configured to store a combined image and
the combined image includes the fluorescence intensity value for the each pixel of the plurality of pixels, a color value of the bright visual field image and the fluorescence information of the specimen.

15. The information processing device according to claim 1, wherein the CPU is further configured to:
learn a correspondence between the fluorescence information of the specimen and the bright visual field image to generate a learning result; and
generate a bright visual field correction image based on the learning result.

16. A non-transitory computer-readable medium having stored thereon, computer-executable instructions which, when executed by a computer, cause the computer to execute operations, the operations comprising:
extracting fluorescence correction information from a bright visual field image of a specimen;
identifying a correction target region of the bright visual field image based on the fluorescence correction information;
correcting, based on fluorescence information of the specimen and the fluorescence correction information, a fluorescence intensity value of each pixel of a plurality of pixels in a region corresponding to the correction target region in a fluorescence image; and
generating a fluorescence correction image based on the correction of the fluorescence intensity value of the each pixel of the plurality of pixels in the region.

* * * * *